(12) United States Patent
Wakabayashi

(10) Patent No.: US 12,450,394 B2
(45) Date of Patent: *Oct. 21, 2025

(54) PRIVACY-PRESERVING MOBILITY AS A SERVICE SUPPORTED BY BLOCKCHAIN

(71) Applicant: Sony Group Corporation, Tokyo (JP)

(72) Inventor: Hideji Wakabayashi, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/543,050

(22) Filed: Dec. 18, 2023

(65) Prior Publication Data

US 2024/0135036 A1  Apr. 25, 2024
US 2024/0232432 A9  Jul. 11, 2024

Related U.S. Application Data

(63) Continuation of application No. 17/278,660, filed as application No. PCT/EP2019/078536 on Oct. 21, 2019, now Pat. No. 11,847,249.

(30) Foreign Application Priority Data

Oct. 25, 2018  (EP) .................................... 18202446

(51) Int. Cl.
 *G06F 21/62* (2013.01)
 *G06F 12/14* (2006.01)
 (Continued)

(52) U.S. Cl.
 CPC ...... *G06F 21/6254* (2013.01); *G06F 12/1408* (2013.01); *G06F 12/1458* (2013.01);
 (Continued)

(58) Field of Classification Search
 CPC ............ G06F 21/6254; G06F 12/1408; G06F 12/1458; G06F 21/602; G06F 21/64; G06F 2221/2141; G06F 2221/2143
 See application file for complete search history.

(56) References Cited

U.S. PATENT DOCUMENTS 8,387,141 B1   2/2013  Zhukov et al.
10,482,554 B1  11/2019  Vukich et al.
(Continued)

FOREIGN PATENT DOCUMENTS

CN   107392040 A   11/2017
CN   107770182 A    3/2018
(Continued)

OTHER PUBLICATIONS

International Search Report and Written Opinion mailed on Nov. 8, 2019, received for PCT Application PCT/EP2019/078536 Filed on Oct. 21, 2019, 9 pages.
(Continued)

*Primary Examiner* — Stephen T Gundry
(74) *Attorney, Agent, or Firm* — XSENSUS LLP

(57) ABSTRACT

The present disclosure provides a communication network node for providing data to a distributed ledger, wherein the node has circuitry configured to:
 provide a user data management part for separating sensitive user data and non-sensitive user data, and
 provide the non-sensitive user data to the distributed ledger.

19 Claims, 15 Drawing Sheets

(51) Int. Cl.
*G06F 21/60* (2013.01)
*G06F 21/64* (2013.01)

(52) U.S. Cl.
CPC ............ *G06F 21/602* (2013.01); *G06F 21/64* (2013.01); *G06F 2221/2141* (2013.01); *G06F 2221/2143* (2013.01)

(56) References Cited

U.S. PATENT DOCUMENTS

| | | | |
|---|---|---|---|
| 11,367,065 B1* | 6/2022 | Umezurike | G06Q 20/3672 |
| 2010/0030605 A1 | 2/2010 | Cargille | |
| 2012/0303616 A1 | 11/2012 | Abuelsaad et al. | |
| 2016/0328488 A1* | 11/2016 | Lytle | G06F 16/252 |
| 2017/0286717 A1 | 10/2017 | Khi et al. | |
| 2017/0331896 A1 | 11/2017 | Holloway | |
| 2017/0366348 A1 | 12/2017 | Weimer | |
| 2018/0108069 A1* | 4/2018 | Zedell | G06F 16/9577 |
| 2018/0189501 A1 | 7/2018 | Ogawa et al. | |
| 2018/0197155 A1 | 7/2018 | Georgen | |
| 2019/0207951 A1* | 7/2019 | Oberhauser | G06Q 20/38215 |
| 2019/0303593 A1* | 10/2019 | Hirano | G06F 21/60 |
| 2019/0303610 A1* | 10/2019 | Bodegas Martinez | G06F 16/152 |
| 2019/0325432 A1* | 10/2019 | Ow | G06Q 20/3678 |
| 2019/0354977 A1* | 11/2019 | Tang | G06Q 20/401 |
| 2020/0089908 A1* | 3/2020 | Faltas | H04L 9/14 |
| 2020/0162463 A1* | 5/2020 | Dykstra | H04L 63/10 |
| 2021/0075623 A1* | 3/2021 | Petersen | G06Q 20/401 |
| 2021/0350469 A1* | 11/2021 | Bryant | G06Q 50/163 |
| 2021/0352080 A1* | 11/2021 | Simons | H04L 9/0618 |
| 2021/0357927 A1* | 11/2021 | Kita | G06Q 20/38215 |
| 2021/0383377 A1* | 12/2021 | Zhou | H04L 9/3213 |
| 2021/0383428 A1* | 12/2021 | Johnson | H04L 9/3239 |
| 2021/0385069 A1* | 12/2021 | Reid | G06F 21/32 |
| 2021/0390585 A1* | 12/2021 | Fournier | H04L 9/3247 |
| 2021/0409221 A1* | 12/2021 | Leong | H04L 63/102 |
| 2022/0012364 A1* | 1/2022 | LaFever | H04L 63/0407 |
| 2022/0012708 A1* | 1/2022 | Sidhu | G06Q 20/401 |
| 2022/0023742 A1* | 1/2022 | Tran | A63F 11/00 |
| 2022/0029815 A1* | 1/2022 | Basu | H04L 9/3236 |
| 2022/0040557 A1* | 2/2022 | Tran | G06F 1/163 |
| 2022/0050921 A1* | 2/2022 | LaFever | G16H 10/60 |
| 2022/0138723 A1* | 5/2022 | Coverstone | G06Q 20/3227 705/44 |
| 2022/0173893 A1* | 6/2022 | Basu | H04L 9/3247 |
| 2022/0180449 A1* | 6/2022 | Leise | H04L 63/101 |
| 2022/0198410 A1* | 6/2022 | Yang | G06Q 20/0655 |
| 2022/0198458 A1* | 6/2022 | Narendranathan | G06Q 20/4016 |
| 2022/0215389 A1* | 7/2022 | Balaraman | H04L 9/30 |
| 2022/0217113 A1* | 7/2022 | Khan | G06Q 20/382 |
| 2022/0224697 A1* | 7/2022 | Thekadath | H04W 12/069 |
| 2022/0245603 A1* | 8/2022 | Mulye | H04N 21/44222 |
| 2022/0245724 A1* | 8/2022 | Nolan | G06Q 20/401 |
| 2022/0254206 A1* | 8/2022 | Dykstra | G07C 9/27 |
| 2022/0343226 A1* | 10/2022 | Ibrahim | G07C 9/29 |
| 2022/0351232 A1* | 11/2022 | Chan | G06Q 30/0215 |
| 2022/0368682 A1* | 11/2022 | Verzun | G06F 21/606 |
| 2022/0374882 A1* | 11/2022 | Katz | G06N 3/04 |
| 2022/0393881 A1* | 12/2022 | Ow | G06Q 20/3678 |
| 2022/0398576 A1 | 12/2022 | Rafalko | |
| 2022/0405750 A1 | 12/2022 | Fallah et al. | |
| 2022/0405857 A1 | 12/2022 | Leise et al. | |
| 2023/0017855 A1 | 1/2023 | Kikinis et al. | |
| 2023/0028324 A1 | 1/2023 | Kikinis et al. | |
| 2023/0039746 A1 | 2/2023 | Magerkurth et al. | |
| 2023/0054446 A1 | 2/2023 | LaFever et al. | |
| 2023/0080322 A1 | 3/2023 | Smith et al. | |
| 2023/0080371 A1* | 3/2023 | Leise | H04L 9/0637 705/4 |
| 2023/0095123 A1 | 3/2023 | Fournier et al. | |
| 2023/0100342 A1 | 3/2023 | Smith et al. | |
| 2023/0108733 A1 | 4/2023 | He | |

FOREIGN PATENT DOCUMENTS

| | | |
|---|---|---|
| CN | 108282459 A | 7/2018 |
| CN | 108694238 A | 10/2018 |
| JP | 2008117058 A | 5/2008 |
| JP | 2009225437 A | 10/2009 |
| WO | WO-2012132046 A1 | 10/2012 |
| WO | 2020/064545 A1 | 4/2020 |

OTHER PUBLICATIONS

Al-Zaben et al., "General Data Protection Regulation Complied Blockchain Architecture for Personally Identifiable Information Management", IEEE, Aug. 16, 2018, pp. 77-82.
Yang et al., "Survey of Confidentiality and Privacy Preserving Technologies for Blockchains", Available Online At: https://z.cash/static/R3_Confidentiality_and_Privacy_Report.pdf, Nov. 14, 2016, pp. 1-31.
Lopez et al., "A Blockchain Framework for Smart Mobility", Published in the Proceedings of IEEE International Smart Cities Conference, Sep. 18, 2018, pp. 1-10.
Grossman et al., "Online Detection of Effectively Callback Free Objects with Applications to Smart Contracts", Cornell University Library, Jan. 12, 2018, 16 pages.
Parecki, "OAuth 2.0", Available Online At: https://oauth.net/2/, Retrieved on Feb. 25, 2021, pp. 1-2.
"Passenger Name Record" Wikipedia, Available Online At: https://en.wikipedia.org/w/index.php?title=Passenger_name_record&oldid=862911162, Retrieved On Feb. 25, 2021, pp. 1-6.
"What are Public, Private and Hybrid Clouds?", Azure, Available Online At: https://azure.microsofl.com/en-gb/overviewwhat-are-private-public-hybrid-clouds/, 10 pages.
"Data Anonymization", Wikipedia, Available Online At: https://en.wikipedia.org/wiki/Data_anonymization, Retrieved On Feb. 25, 2021, pp. 1-3.
"Pseudonymization", Wikipedia, Available Online At: https://en.wikipedia.org/wiki/Pseudonymization, Feb. 25, 2021, pp. 1-3.
"General Data Protection Regulation", Wikipedia, Available Online At: https://en.wikipedia.org/wiki/General_Data_Protection_Regulation, Feb. 25, 2021, pp. 1-18.
"Public-Key Cryptography", Wikipedia, Available Online At: https://en.wikipedia.org/wiki/Public-key_cryptography, Feb. 25, 2021, pp. 1-15.
"Salt (Cryptography)", Wikipedia, Available Online At: https://en.wikipedia.org/wiki/Salt_(cryptography), Feb. 25, 2021, pp. 1-4.
"Art. 4 GDPR Definitions", Available Online At: https://gdpr-info.eu/art-4-gdpr, Feb. 25, 2021, pp. 1-4.
"Transit Pass", Wikipedia, Available Online At: https://en.wikipedia.org/wiki/Transit_pass, Feb. 25, 2021, pp. 1-8.
Anonymous: "Fujitsu Releases Notebook PC with "Clearsure" Security Solution", Aug. 24, 2009 (Aug. 24, 2009), XP093038551, Retrieved from the Internet: URL: https://www.fujitsu.comlglobaliabout/resourcesinewslpress-releases/2009/0824-01.html [retrieved on Apr. 12, 2023].
Naganuma, et al., "Decentralized Netting Protocol Over Hyperledger Fabric", Hyperledger Fabric , Inc., Ltd. Non-centralised , 2018 years, 01 months, and 23 days, respectively, using (Document indicating well-known arts).
Yoshiki et al., "A Study on certificate management in consortium chain", 2017 A code, information security symposium (SCIS2017) [USB], Japan, 2017, information security symposium execution, Jan. 24, 2017,1F2-3.

* cited by examiner

PRIVACY-PRESERVING MOBILITY AS A SERVICE SUPPORTED BY BLOCKCHAIN

CROSS-REFERENCE TO RELATED APPLICATIONS

The present application is a continuation of U.S. application Ser. No. 17/278,660, filed Mar. 23, 2021, which is based on PCT filing PCT/EP2019/078536, filed Oct. 21, 2019, which claims priority to EP 18202446.3, filed Oct. 25, 2018, the entire contents of each are incorporated herein by reference.

TECHNICAL FIELD

The present disclosure generally pertains to a communication network node, a communication network and a method for providing a distributed ledger.

TECHNICAL BACKGROUND

Generally, it is known to distribute a ledger over multiple nodes such as entities, e.g. electronic devices, servers or the like, which record digital transactions. Distributed ledgers can be based on the known blockchain technology, on which, for example, the known cryptocurrency bitcoin is based, but also the well-known Ethereum project, etc. Generally, a distributed ledger may also be implemented on other technologies than the blockchain technology and examples of distributed ledger projects which are not based on blockchain are BigchainDB and IOTA or the like. For instance, IOTA is a crypto currency which uses linked lists.

Moreover, mobility as a service (MaaS) is known, where a user or passenger uses mobility as a service without owing, for example, a car or the like. Mobility as a service may combine public (e.g. train, bus, etc.) and private (e.g. car sharing, bicycle sharing, etc.) transportation services from associated operators or providers.

Known MaaS solutions typically involve a central and unified gateway through which a trip or journey is planned and booked, wherein a user may pay with a single account.

Although there exist techniques for providing a distributed ledger and mobility as a service, it is generally desirable to provide a communication network node, a communication network and a method for controlling a communication network for providing a distributed ledger.

SUMMARY

According to a first aspect, the disclosure provides a communication network node for providing data to a distributed ledger, wherein the node comprises circuitry configured to provide a user data management part for separating sensitive user data and non-sensitive user data, and provide the non-sensitive user data to the distributed ledger.

According to a second aspect, the disclosure provides a communication network comprising multiple nodes for providing a distributed ledger, wherein at least one node comprises circuitry configured to provide a user data management part for separating sensitive user data and non-sensitive user data, and provide the non-sensitive user data to the distributed ledger.

According to a third aspect, the disclosure provides a method for controlling a communication network comprising multiple nodes for providing a distributed ledger, the comprising providing a user data management part for separating sensitive user data and non-sensitive user data, and providing the non-sensitive user data to the distributed ledger.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
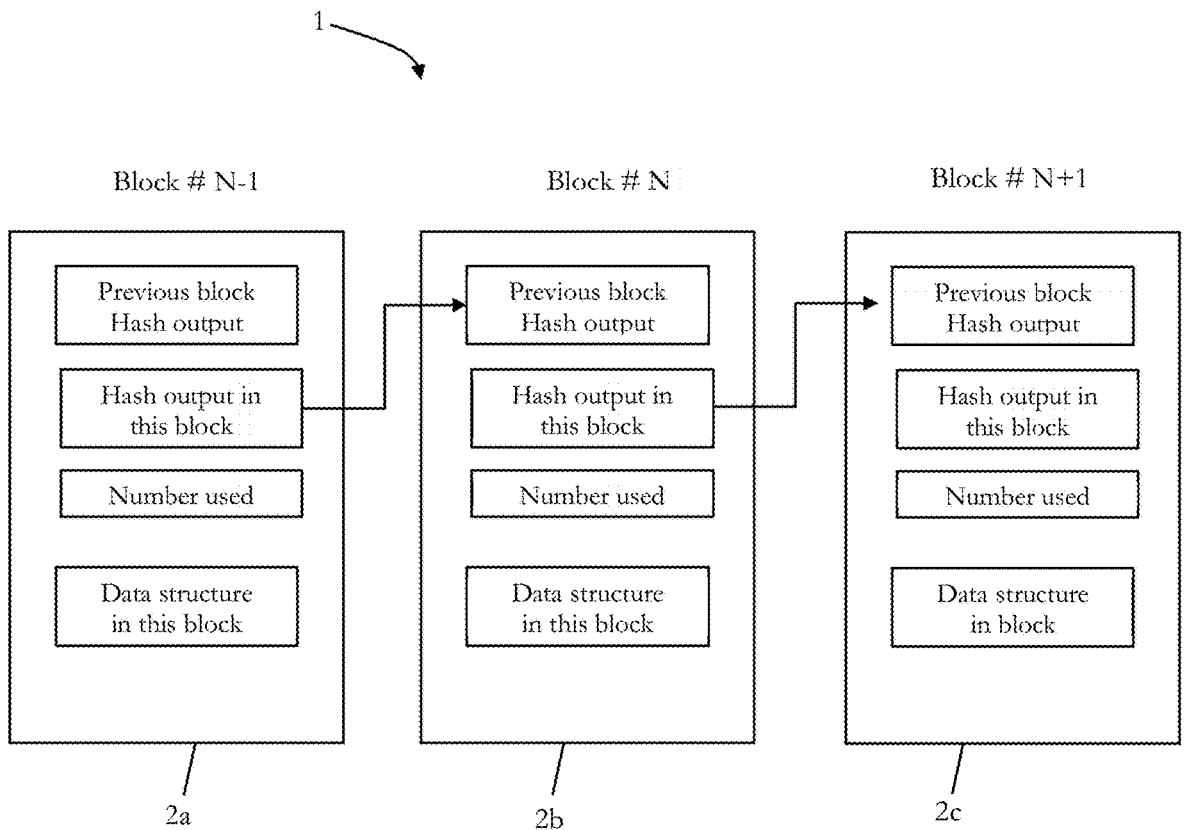
FIG. 1 schematically illustrates a blockchain.

Before a detailed description of the embodiments under reference of FIG. 1 is given, general explanations are made.

As mentioned in the outset, generally, distributed ledgers and mobility as a service (MaaS) are known.

The present disclosure pertains generally in some embodiments or aspects to the application of blockchains/distributed ledger for mobility as a service (MaaS) application, in particular MaaS among more than one service provider (multi-modal transports).

The present disclosure also generally pertains in some embodiments or aspects to the application of a distributed ledger or blockchain as one example for a distributed ledger, without limiting the present disclosure to blockchains. Distributed ledgers or blockchains are recognized to be suitable for Mobility as a service (MaaS) applications according to some aspects of the present disclosure, since a distributed ledger requires a distributed database for journey history (or journey data) among multiplayers, i.e. multiple mobility as a service providers.

In some embodiments, MaaS blockchains may require to handle a large number of passengers, store various types of journey records, large size of block, peak of processing at rush hour and so on.

In some embodiments, generally the distributed ledger or blockchain is suitable for MaaS application, since it provides a distributed database for a journey history among multiple players.

However, the personal data protection may be challenging for blockchains/distributed ledger, since the personal data may typically be open for all the members of blockchains and the recoded data in the block cannot be deleted/modified by user.

Hence, it has been recognized that it may be useful in some embodiments to provide protection of user privacy with blockchains based distributed ledger, especially for MaaS application. Moreover, the requirements between recording the passenger's journey and protecting the passenger's privacy might be I conflict with each other in some embodiments.

In some embodiments, in terms of accurate recording of the passenger's journey, the distributed ledger can be shared among players (including mobility service provider) and may even be immutable. Such a characteristic is suitable in some embodiments for the record/evidence of journey like revenue share calculation. In addition, a government transport authority may require to keep the record of passenger information, in particular as it is known for air travel.

On the other hand, in some embodiments, MaaS journey records may be included in sensitive passengers' information, such as where, when, who and what the passenger is doing. Hence, in terms of personal data protection, anonymization and pseudonymization may be applied. In some embodiments, requirements for protecting the personal data exist, such as the general data protection right (GDPR).

Therefore, in this disclosure, some embodiments, pertain to the issue of how to protect personal data with access control and how to provide a method of anonymization and pseudonymization of passengers' data.

Thus, in some embodiments, personal information is confined to an inaccessible part of a system, which may not accessible by a third party. Also, in some embodiment, the confidentiality of user profile/multi-modal pass information is ensured by a mobility service provider which has the contract with a user, whereas user specific ID, for example, is anonymized in a distributed ledger or blockchain. A journey log included in a distributed ledger or blockchain may be under access control and the contents of the journey log may be pseudonymized.

In the following, some terminology definitions are given, which may be applied in some embodiments (without limiting the present disclosure to the definitions given in the following. The definitions are only examples which are provided for enhancing the understanding of the present disclosure and which are only given, since the technology fields of MaaS and distributed ledgers are highly dynamical and definitions may change in the future.).

The term "distributed ledger" may be known from Wikipedia, which defines: "distributed ledger (also called a shared ledger, or distributed ledger technology, DLT) is a consensus of replicated, shared, and synchronized digital data geographically spread across multiple sites, countries, or institutions. There is no central administrator or centralized data storage."

The technology of a distributed ledger and of a special example of it, namely of a blockchain, will also be discussed further below. More generally, the term distributed ledger is used as a type of database shared digitally recorded data with multiple nodes of a network. It may be comprised of peer to peer network. The digitally recorded data may include a kind of information to prove its consistency from the previously recorded data on the same database.

Distributed ledgers can be public and can be accessible by anyone, but, in principle, they can also be non-public and only users having a permission may have access to them, wherein a group of entities, nodes, persons, operators, providers or the like which have the permission may also referred to as "consortium", as will also be explained further below. It is also possible to differentiate the access permission to data on a ledger from each layered users.

Distributed ledgers can use mechanisms, which are known, for example, from the blockchain technology as used for bitcoin. Such mechanisms include a discovery method, a consensus mechanism, a mechanism to keep data consistency and so on. The consensus mechanism ensures that all nodes or more than a certain number of nodes, generally electronic devices, having a copy of the distributed ledger reach consensus on the content of the distributed ledger. There are many consensus mechanisms including the so-called proof-of-work mechanism, which is some kind of crypto-puzzle and which ensures that, for example, older blocks of a blockchain cannot be changed (easily). For instance, proof-of-work is used for the mining process of the bitcoin blockchain.

In a distributed ledger or blockchain, a confirmation process to make a consensus about data renewal on a blockchain in attending nodes, called a mining process, may achieve irreversibility of the sequence of transactions recorded on the blockchain by including previous recorded data in the confirming data. Such mining process implements a distributed timestamp server for a new block of transactions. In bitcoin (and, thus, in some embodiments) the mining process is based on the SHA-256 hash function. Nodes of the blockchain that participate in the mining process search for a hash output with predefined properties while the input of the hash function depends on the current blocks of the blockchain and the new block of transactions to be added to the blockchain.

Proof-of-work computations based on hash functions may not be useful in themselves except that they are required to implement the irreversibility of the distributed ledger.

Moreover, generally, it is known to use a blockchain for storing a variety of data. For instance, images, videos, measurements, and text files can be recorded on the blockchain in the form of a transaction.

The term "Mobility as a service (MaaS)", is also known from Wikipedia, which defines: "Mobility-as-a-Service (MaaS) describes a shift away from personally-owned modes of transportation and towards mobility solutions that are consumed as a service. This is enabled by combining transportation services from public and private transportation providers through a unified gateway that creates and manages the trip, which users can pay for with a single account. Users can pay per trip or a monthly fee for a limited distance. The key concept behind MaaS is to offer travelers mobility solutions based on their travel needs."

A "Public blockchain/distributed ledger" means in some embodiments, that anyone can share the distributed database (ledger) and join to execute the consensus protocol, as also indicated above.

In contrast to that, a "Permissioned blockchain/distributed ledger" means that only permitted members can share the distributed database (ledger) and join to the consensus protocol. Permitted members which have the permission to access the blockchain are called "consortium", as indicated above. In some embodiments, permissioned/consortium type blockchains are suitable for MaaS application, since they are not public and, thus no one can access it.

The term "(Mobile) edge computing" can also be find at Wikipedia, which defines: "Multi-access Edge Computing (MEC), formerly Mobile Edge Computing, is a network architecture concept that enables cloud computing capabilities and an IT service environment at the edge of the cellular network[1][2] and, more in general at the edge of any network. The basic idea behind MEC is that by running applications and performing related processing tasks closer to the cellular customer, network congestion is reduced and applications perform better."

The term "Northbound API" is understood in a network virtualization context in the sense that a telecom operator can configure the network function with a software based interface (API) and that the network operator may configure the virtual infrastructure (e.g. virtual machine) and requested network functions/application functions.

The term "Instance" is understood as a software process running on a cloud. It may move somewhere in the distributed cloud.

A "Public cloud" may be defined as (https://azure.microsoft.com/en-gb/overview/what-are-private-public-hybrid-clouds/): "Public clouds are the most common way of deploying cloud computing. The cloud resources (like servers and storage) are owned and operated by a third-party cloud service provider and delivered over the Internet."

In some embodiments, the following terms will be used in the given understanding:

The term "multimodal transport pass" may be a pass which is valid for multi mobility services with specific conditions, such as valid period or available transport, unacceptable services, etc. For instance, a one-day ticket, one-week ticket, monthly MaaS service subscription, seasonal ticket, etc.

The term "mobility service provider" may be a catch-all name of any type of service provider MaaS. In some embodiments, it is typically a transport organization, such as railway companies, bus/coach, tram and taxi, car sharing, ride sharing, bike sharing and so on. Some of the mobility service providers may not provide the actual transport means, but may provide only a booking/arrangement, comparable to a travel agency or online booking site or the like.

The term "Pass" may be a transit pass or travel card (UK) (see also https://en.wikipedia.org/wiki/Transit_pass). In the present disclosure, a multi-modal pass shall also fall under the term "pass", which means that the pass may be valid among more than one transport operator (or mobility service provide) and, thus, it may cover not only public transport, but also cover other types of mobility, such as ride share, bike share, etc. The pass may include the information of acceptable transport, valid period, and any other conditions of ticket issue/transport ride. The MaaS may provide a monthly service subscription with some option of service level in some embodiments. A passenger or user may pay the service subscription fee or purchase of specific period pass to a pass issuer (which may typically be a mobility service provide which issues the pass). The pass may be issued by transport operators or travel agencies, MaaS service provider, etc. (which may all fall under the term mobility service provider as discussed above). Hence, as mentioned, some of the pass issuers may sell a pass, but may not provide the actual transport service or transport means.

The term "Ticket" may be a ticket for a one-way journey of the specific section like one-way train ticket with (or without) seat reservation. The ticket may be issued under the multi-modal transport pass and its terms and conditions in some embodiments and it may include the information of selected transport, seat number, price, etc. In some embodiments, even if no seat reservation is required or unlimited travel is allowed, the ticket may be issued for revenue sharing among multiple mobility service providers. Moreover, a passenger (user) may not directly pay for a ticket issuer, but a pass issuer may pay for the ticket issuer instead of the passenger and the ticket may be issued by a transport operator or service provider, i.e. by a mobility service provider.

The term "Journey log" may cover a journey log which is a one-way journey record based on the ticket. It may include information about the location of embankment, time/day of it, the location of alight, time/day of it, whether the ticket is used or unused, etc., which will also be discussed further below.

The term "anonymization" may be defined in accordance with Wikipedia (see also https://en.wikipedia.org/wiki/Data_anonymization): "Data anonymization is a type of information sanitization whose intent is privacy protection. It is the process of either encrypting or removing personally identifiable information from data sets, so that the people whom the data describe remain anonymous."

The term "pseudonymization" may be defined in accordance with Wikipedia (see also https://en.wikipedia.org/wiki/Pseudonymization): "Pseudonymization is a data management and de-identification procedure by which personally identifiable information fields within a data record are replaced by one or more artificial identifiers, or pseudonyms. A single pseudonym for each replaced field or collection of replaced fields makes the data record less identifiable while remaining suitable for data analysis and data processing."

The term "untraceablity" may be understood in the sense that no one (e.g. not entity, user, person, etc.) can trace the history of an action or behavior. For example, it may be prevented that it is possible to track back where a user has been at a specific day/time, what he has done or what he has not done.

Moreover, a General Data Protection Regulation (GDPR) may require (see also https://en.wikipedia.org/wiki/General_Data_Protection_Regulation): "The General Data Protection Regulation (EU) 2016/679 ("GDPR") is a regulation in EU law on data protection and privacy for all individuals within the European Union (EU) and the European Economic Area (EEA)."

The term "personal data" may be understood in some embodiments in the sense (see exemplary https://gdpr-info.eu/art-4-gdpr/): "(1) 'personal data' means any information relating to an identified or identifiable natural person ('data subject'); an identifiable natural person is one who can be identified, directly or indirectly, in particular by reference to an identifier such as a name, an identification number, location data, an online identifier or to one or more factors specific to the physical, physiological, genetic, mental, economic, cultural or social identity of that natural person;"

The "pseudonymization in GDPR" may be understood accordingly as: "(5) 'pseudonymization' means the processing of personal data in such a manner that the personal data can no longer be attributed to a specific data subject without the use of additional information, provided that such additional information is kept separately and is subject to technical and organizational measures to ensure that the personal data are not attributed to an identified or identifiable natural person;"

In some embodiments, the term "public-key cryptography" is understood as defined also in Wikipedia (https://en.wikipedia.org/wiki/Public-key_cryptography): "Public-key cryptography, or asymmetric cryptography, is any cryptographic system that uses pairs of keys: public keys which may be disseminated widely, and private keys which are known only to the owner. This accomplishes two functions: authentication, where the public key verifies that a holder of the paired private key sent the message, and encryption, where only the paired private key holder can decrypt the message encrypted with the public key." Wherein, "Two of the best-known uses of public key cryptography are: Public key encryption, in which a message is encrypted with a recipient's public key. The message cannot be decrypted by anyone who does not possess the matching private key, who is thus presumed to be the owner of that key and the person associated with the public key. This is used in an attempt to ensure confidentiality.", and, "Digital signatures, in which a message is signed with the sender's private key and can be verified by anyone who has access to the sender's public key. This verification proves that the sender had access to the private key, and therefore is likely to be the person associated with the public key. This also ensures that the message has not been tampered with, as a signature is mathematically bound to the message it originally was made with, and verification will fail for practically any other message, no matter how similar to the original message."

In some embodiments, the term "salt" is understood in accordance with Wikipedia (https://en.wikipedia.org/wiki/Salt_(cryptography)): "In cryptography, a salt is random data that is used as an additional input to a one-way function that "hashes" data, a password or passphrase. Salts are closely related to the concept of nonce. The primary function of salts is to defend against dictionary attacks or against its hashed equivalent, a pre-computed rainbow table attack."

In the following a general outline of the description is given, wherein embodiments for four different aspects of the present disclosure will be discussed, which may be implemented or realized as separate aspects or which may be combined with each other in any possible combination.

According to a first aspect, some embodiments pertaining to basic techniques are discussed, including sensitive data separation (with off-chain technique) and a naïve method of pseudonymization and anonymization (with scrambling and/or hashing).

According to a second aspect, some embodiments pertain to the access control of data, wherein the access control may include a level of Access control, a block encryption with different access keys, and/or open data and API.

According to a third aspect, some embodiments pertain to erasing of sensitive data, including, for example, key invalidation and/or block erase.

In the following a blockchain and its general data structure will be explained under reference of FIG. 1. In this embodiment of a blockchain, features are a network/topology, a consensus algorithm a Hash function, participant authentication, a scalability/block structures and performance.

FIG. 1 illustrates a general structure of a blockchain 1. The blockchain 1 includes a chain of multiple data blocks 2a, 2b and 2c, wherein the block 2b is a current block (Block #N), the block 2a is a previous block (Block #N−1) and the block 2c is a future or successor block (Block #N+1). Each block includes a hash function result of a previous block, a main data structure, an input value for hash function and hash function result of the current block, wherein the hash function result of current block (2b) is always used as input to the next block (2c).

Moreover, each block includes a "Number used once", which is a one-shot random number for a secure blockchain processing, and which can prevent replay attack. For instance, if an attacker copies the previous transmitted data and reuses the copied data again for spoofing, the receiver is able to detect the spoofing communication because the next data must be used with a different "number used once". This random number is sometimes referred to as "nonce" in cryptocurrency.

Additionally, the time stamp may be inserted in each of the blocks 2a, 2b and 2c. The blockchain 1 is an example of a distributed ledger, which may be used, for example, for providing MaaS in some embodiments.

Figure 2:
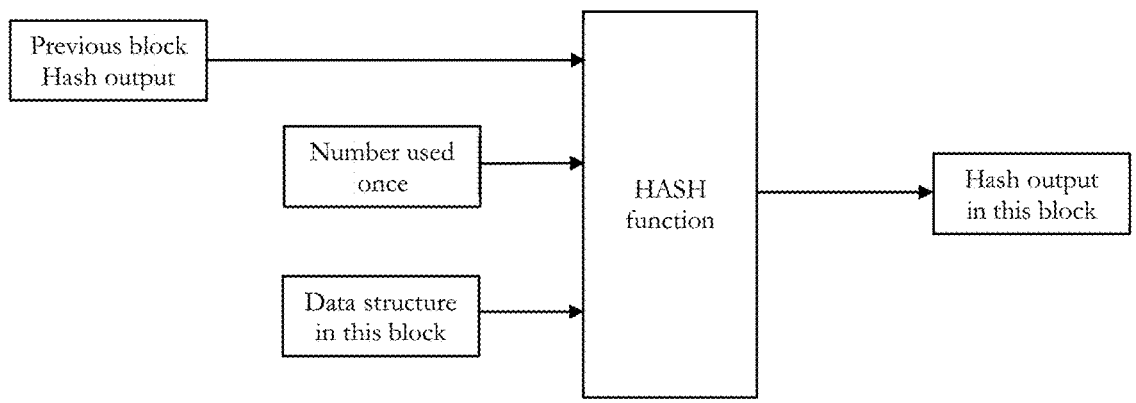
FIG. 2 schematically illustrates hashing in a blockchain.

FIG. 2 illustrates the input and output of a hash function, which is used, for example, for the blockchain 1 of FIG. 1.

Generally, a hash function is any function that can be used to map input data to output data with a specific algorithm. The size of input data can be large and various, contrarily the output of data could be compact and can have a fixed size. A known (and famous) algorithm which is used for hashing in some blockchain embodiments is the Secure Hash Algorithm (SHA) designed by the United States National Security Agency (e.g. SHA-2, SHA-256).

The input for the hash function are a previous hash output, the number used once and the main body of data in the current block (e.g. block 2b in FIG. 1). The output of the hash function is a unique value response to the input values. If someone tries to tamper the main body of data, the output of hash function cannot be consistent.

Embodiments of a distributed ledger (blockchain) in this disclosure may implement a consensus protocol or algorithm. For instance, in some embodiments, the Byzantine Fault Tolerance (BFT) is used for the consensus protocol, which is resilient to spoofing of database and fault of hardware.

A well-known consensus algorithm, which is implemented in some embodiment, is the so-called Practical Byzantine Fault Tolerance (PBFT).

In some embodiments, a permission blockchain is used and the relatively small number of permissioned blockchain nodes are in charge of consensus (validation of block).

Figure 3:
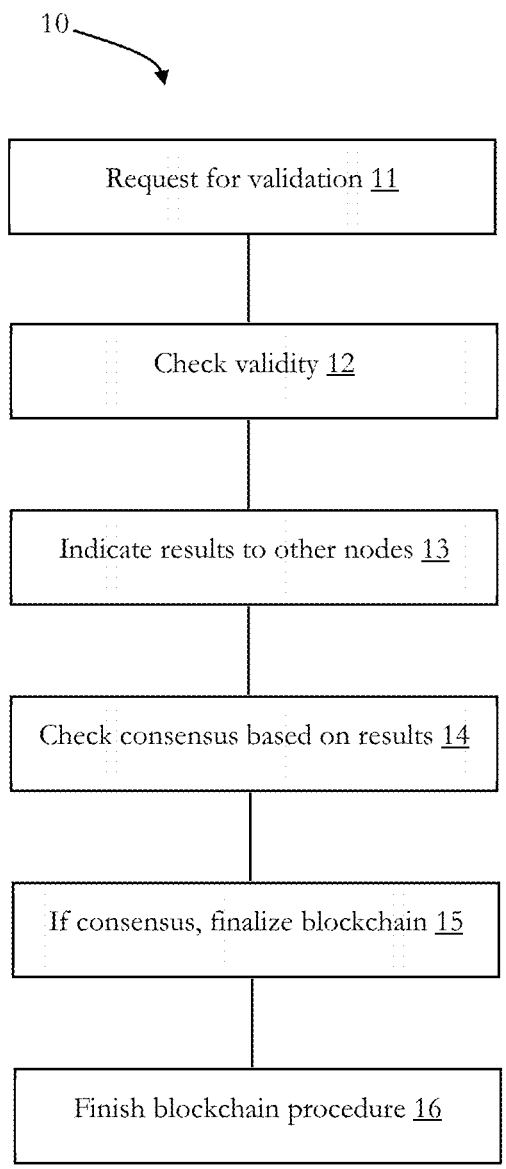
FIG. 3 is a flowchart illustrating an embodiment of a consensus protocol.

FIG. 3 exemplary illustrates the process 10 of PBFT.

A leader node (it also called non-validating peer) requests at 11 other nodes to validate the blockchain. At 12, each requested node (validate peer) checks the validity of the blockchain with a hash function and indicates its result to other nodes at 13. At 14, a node receives the validity results from multiple other peers and checks the consensus of the blockchain, if it receives more valid results than a predefined criteria. If there is a consensus, at 15, the node writes/finalizes the blockchain. A leader peer checks the overall progress of the validity check in other nodes and finishes at 16 the blockchain procedure.

For resilience, the total number of nodes is more than 3f+1 in some embodiments, wherein f is the number of allowed failure nodes. For example, f=1, there is a total 4 nodes; if f=3, there is a total of nodes, etc.

In some embodiments, the PBFT is with permission blockchains for mobility service blockchains, as discussed herein, providing at least partially the following features:

With respect to security, the PBFT provides in some embodiments a little risk of 51% attack, which is common for cryptocurrency because permission the peer which is in charge of consensus must be trusted. With respect to privacy, the end user cannot access the whole blockchain because only mobility service providers handle it at a (peer) node (due to the permission based blockchain and end users may not have the permission to access the blockchain). With respect to performance, the processing time for consensus is very short in some embodiments due to a small number of peers having a high performance. With respect to flexibility, the block size and format of blockchains can be flexible compared to public blockchains in some embodiments.

Figure 4:
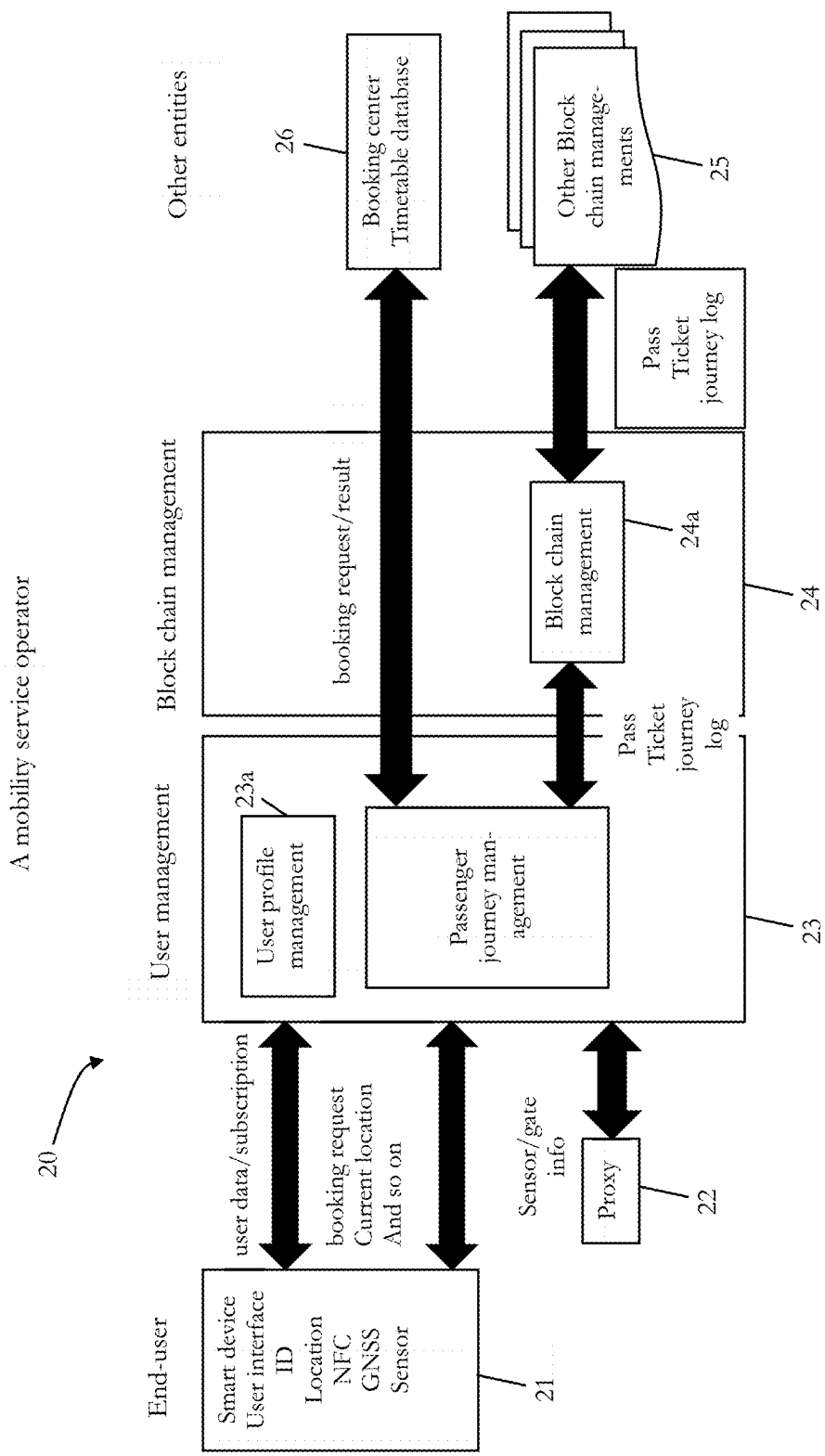
FIG. 4 illustrates a data flow in a MaaS system.

In the following, the data flow of a MaaS system 20 is explained under reference of FIG. 4, illustrating the overall data flow. In the MaaS system 20 it is exemplary assumed that the end-user has an own terminal 21, e.g. a smart phone (or any other type of electronic (mobile) device). Some users (e.g. visitor from oversea) may not have a smartphone or the like, and in such cases, for example, an alternative solution may be provided, which is based on a proxy function (proxy 22) in FIG. 4, which provides a gate to the user.

FIG. 4 illustrates the data flow diagram of the MaaS system 20, wherein three main sections are provided, an end-user section on the left side, a mobility service operator/provider section in the middle and an other entities section on the right side, wherein the end-user section and the other entities section communication with the mobility service provide section in the middle.

For this embodiment of the MaaS system 20 it is assumed that the mobility service provider has a user management function 23 with a web server or cloud for customer services and a user profile management function 23a and a passenger journey management function 23b. It further has a block-chain management function 24. The blockchain function 24 having the block chain management function 24a communicates with blockchain management functions 25 of other entities section. If a seat reservation/shared ride booking is provided by a booking center 26, a central booking server/cloud is provided.

The end user communicates with its own terminal, i.e. smart phone 21 in this embodiment, which has exemplary a user interface and sensors, e.g. GNSS, NFC, etc.

As can also be taken from FIG. 4, the end user can perform, for example, the following actions with the terminal or via the proxy 22: Subscription of services/purchase of one day/one week ticket; booking of train, reservation of car/ride share; transport embark/alight permission/record; post processing after alight (e.g. customer survey, refund or compensation of delay), etc.

The user profile management function 23a is configured to store static data, e.g. name, age, contact address, payment method (e.g. credit card), service subscription status, the preference of transport, any other unique ID like TMEI, etc. and communicates with the terminal 21.

The passenger journey management function 23b is configured to perform several actions and to communicate with the terminal 21. For instance, with respect to a multimodal transport pass it manages, for example, a subscription of MaaS monthly service and a purchase of one-day ticket, one-week ticket, etc. With respect to a journey planning (or journey planner), it provides destination input, route selection/transport options, booking/travel arrangement and issues the ticket and issues the ticket ID, generates itinerary for the passenger and issues the itinerary ID etc. On the journey of a passenger/user, the passenger journey management function is configured to start the journey and, for each section of the journey (iteration), to check the pass/ticket hold and record the embankment, record the alight and add the journey log to the blockchain, and at the end of journey to terminate it and to close the itinerary.

The blockchain management function 24a communicates with the passenger journey management function 23b and the other block managements 25. It is configured to add, to validate/execute consensus protocol and to read the block-chains. Moreover, as can also be taken from FIG. 4, the pass, ticket and journey log information is communicated at least between the passenger journey management function 23b and the block chain management function 24a and between the block chain management function 24a and the other blockchain managements 25.

In the following, an embodiment of a blockchain 30 including a passenger journey history is explained under reference of FIG. 5.

Figure 5:
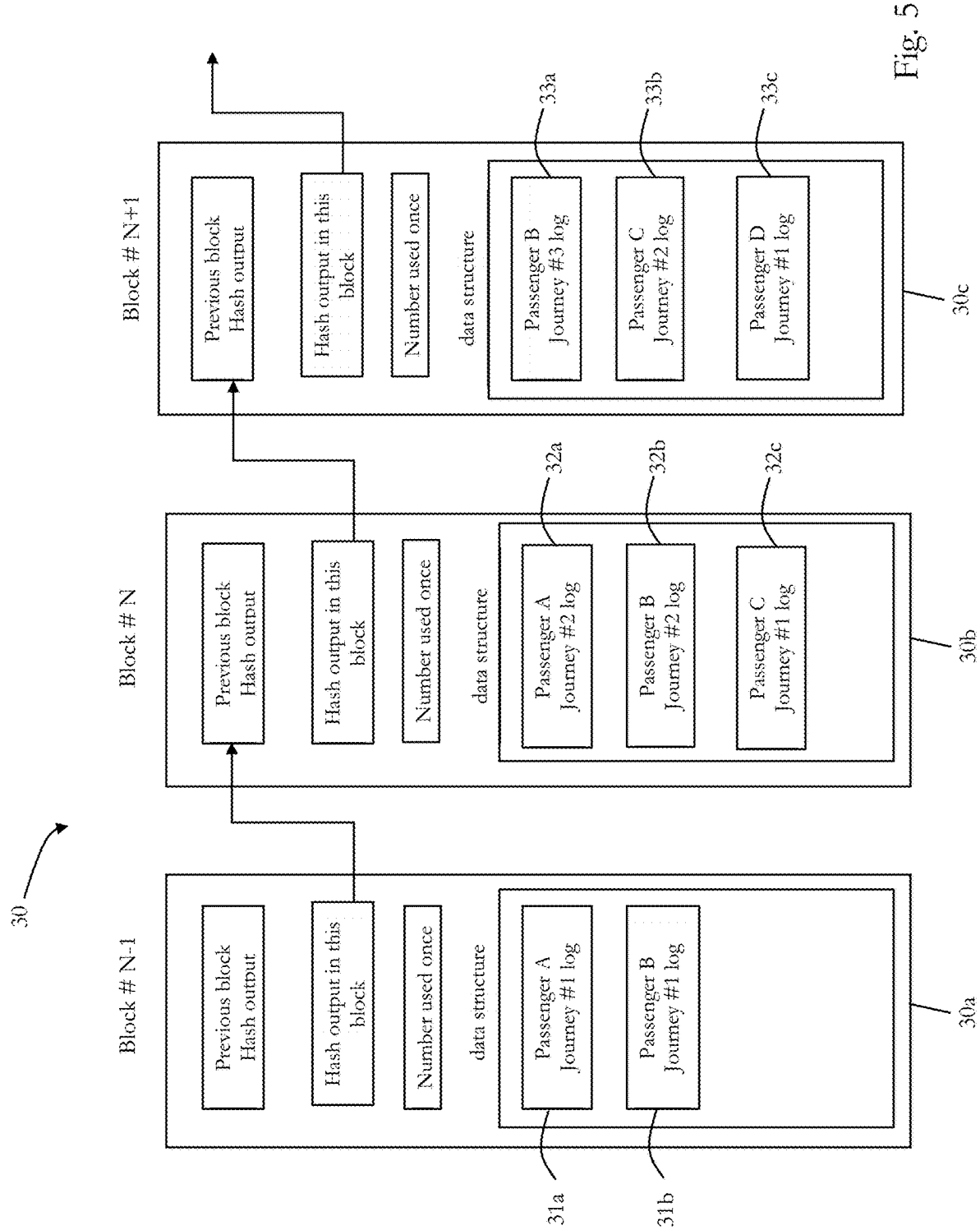
FIG. 5 illustrates an embodiment of a blockchain including journey log data.

The blockchain 30, as also generally explained under reference of FIG. 1, has several blocks 30a, 30b, 30c, wherein in FIG. 5 a past block 30a (Block #N−1), a current block 30b (Block #N) and a successor or next/future block 30c (Block #N+1) are exemplary illustrated.

Each of the blocks 30a, 30b and 30c can include one or more passenger logs in a transaction within a maximum given block size and within an associated data structure. In FIG. 5, the block 30a on the left hand side (Block #N−1) handles two passenger logs 31a and 31b. The hash output from the N−1 block 30a is provided to the next N block 30b (current block). The block 30b (Block #N) handles the next journey logs 32a and 32b of passengers A and B, and, additionally, a journey log 32c of a passenger's C journey. If, for example, a passenger D issues a new journey log, but if simultaneously the block size limit is exceed, the further journey log will be handled in the next block, i.e. in block 30c in the present example, which includes a further journey log 33a entry for passenger B, a further journey log entry 3cb of passenger C and a further journey log 33c entry for passenger D, such that the block 30c (Block N+1) handles the next journeys of passenger C and D and the remaining log of passenger D. Then, the hash output (N+1) is provided to the next block (N+2) (not shown in FIG. 5).

Generally, a journey log in the blockchain 30 may include at least one of the following information:

Issuers: multimodal transport pass issuer, mobility service provider/transport operator, passenger id (anonymized data).

Ticket info: Type of ticket, Type of transport (railway, rideshare and so on), Seat reservation (train/seat number), Price or ticket, Terms and conditions.

Boarding record: The location of embankment, time/day of it, the location of alight, time/day of it, Unused/used.

Remarks: Special notes (e.g. cancelled, delayed).

In some embodiments, the blockchain for MaaS is assumed to use permissioned blockchains. In permissioned blockchains, only permitted operators (forming a consortium) can add/read block and limited participants are allowed to join the validation of transaction (i.e. consensus with trusted players). Hence, in some embodiments, for example, the mobility service providers are organized in a consortium and only those having the according permission are allowed to access the permissioned distributed ledger or blockchain, while malicious participants or dishonest ones cannot join the consortium of blockchain.

In the following, an embodiment of a communication network 40 for providing a (permissioned) blockchain for MaaS is explained under reference of FIG. 6.

In terms of resilience, the communication network 40 mitigates the risk of single point of failure (SPOF), which is typically the weak point of systems, e.g. for conventional systems which are heavily relying on the central of server could be SPOF in the system.

Figure 6:
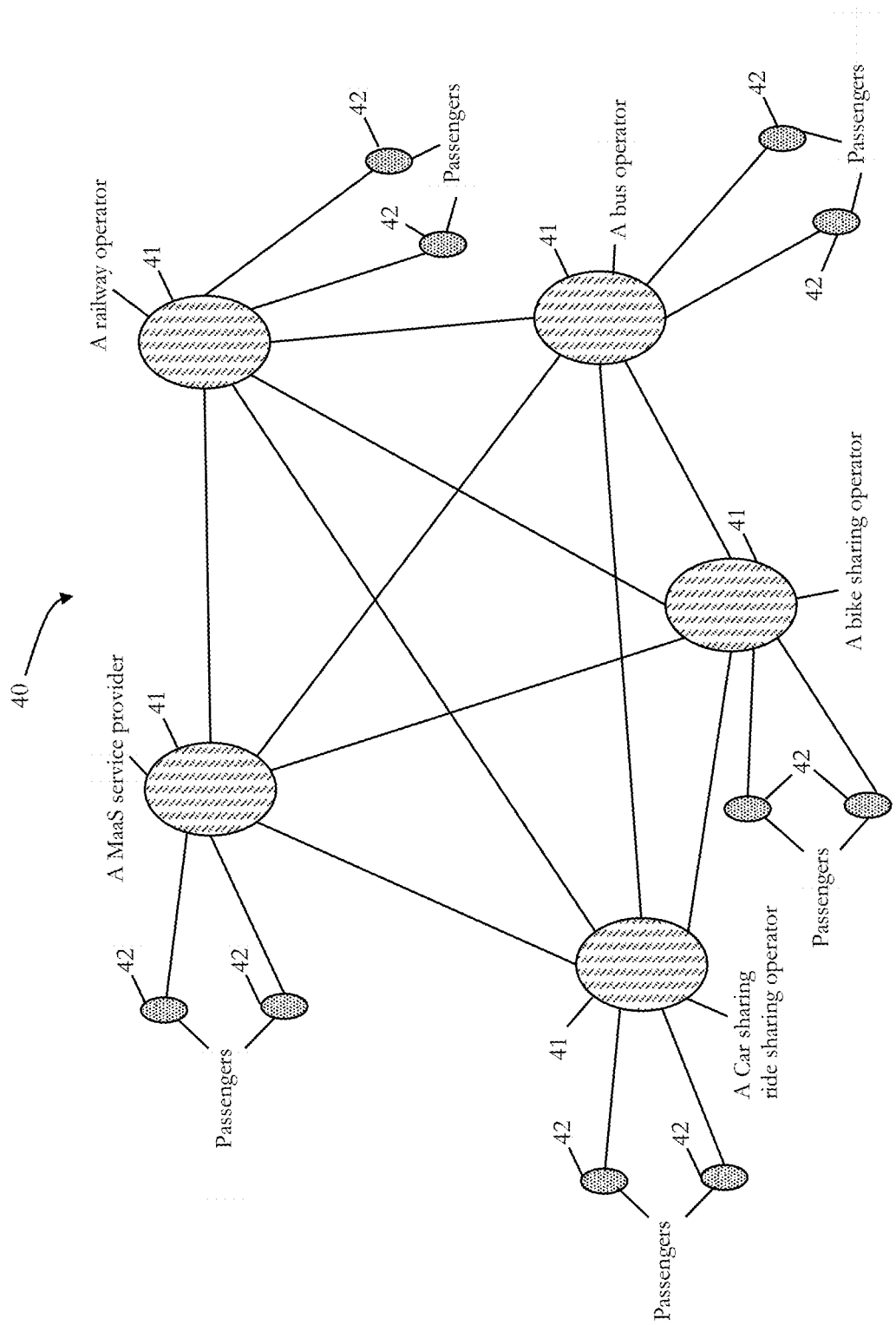
FIG. 6 illustrates an embodiment of a communication network for providing a blockchain.

As can be taken from FIG. 6, the communication network 40 has multiple nodes (or entities) 41 (large circles), which are associated with different operators or mobility service providers, such as a MaaS service provider, railway operator, a car sharing/ride sharing operator, a bike sharing operation and a bus operator.

Moreover, there are multiple passengers 42 (small circles) which can communicate with the nodes 41 of the mobility service providers. The mobility service provider nodes 41 may form together a communication network 40, which provides the permissioned blockchain for MaaS (e.g. blockchain 30 of FIG. 5).

A passenger 42 subscribes, for example, the monthly MaaS service provided by mobility service provider or buy one-day/one-week pass for multi-modal transport services by communicating with its terminal (e.g. terminal 21 of FIG. 4) with the associated mobility service provider.

The mobility service provider 41 could be a new service provider, such as MaaS operator (e.g. shared ride), bike sharing service provider, travel agency in addition to conventional transport operators such as car railway companies, tram operator, as mentioned.

The mobility service providers 41 connect to one another over the communication network, which is a logical connection, wherein a direct connection among operators or mobility service providers is not necessarily required, but it may require low latency and high throughput.

The entity or node 41 of a mobility service provider may have various functions, but there are two main functions, as also discussed above for FIG. 4, namely a passenger management function and the blockchain management function. The passenger management function supports booking of seat, booking of shared ride/taxi/car rental/seat reservation of train, monthly subscription or buying one-day ticket and so on. Like a normal e-commerce site, it provides a user interface of website or smart phone back-end processing.

On the other hand, the blockchain is hidden for the end-user in the present embodiment, but it is accessed with and by multiple mobility service providers. Additionally, in the present embodiment, a consortium (permissioned) blockchain is implemented among nodes 41, which validates the blockchain ledger among the mobility service providers which are members of the consortium.

In some embodiments this above example is extended to international MaaS operation or MaaS operation in different regions. The blockchain is then defined as a multi-tier structure. The first tier blockchain is configured between countries or between regions and the second tier blockchain is configured in the consortium of the region. For example, a representative provider in regional consortium may join the first tier blockchains and handle the international services.

As mentioned, some embodiments pertain to the separation of personal information of a user in service subscription/user profiles.

Figure 7:
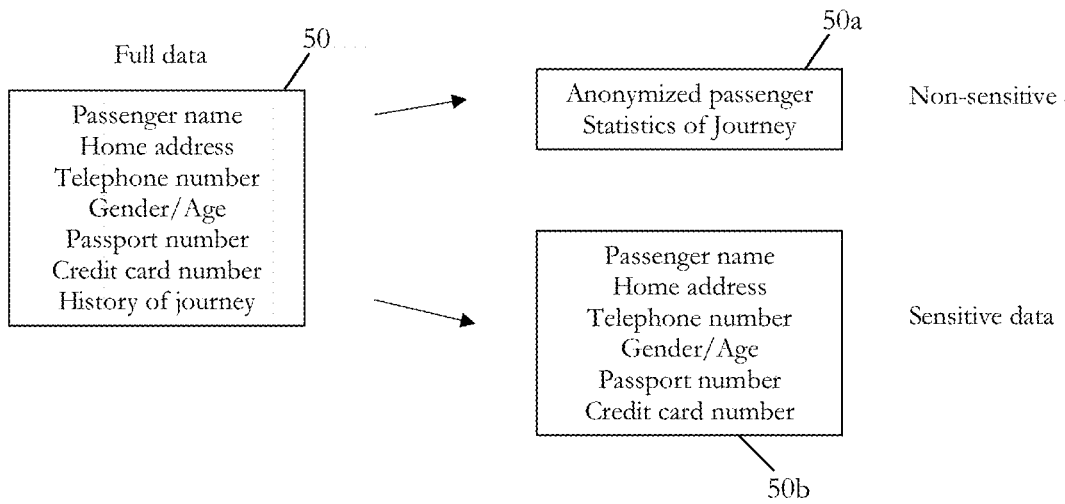
FIG. 7 illustrates an embodiment of separating sensitive and non-sensitive data.

In some embodiments, as also illustrated in FIG. 7, as a first step, master (full) data 50 of a passenger (user) the sensitive information is separated. Here, the full data 50 includes personal (sensitive) information (e.g. passenger, name, home address, telephone, number, gender, age, passport number, credit card number, etc.) as well as non-sensitive data, such as journey data or statistics of the journey. As FIG. 7 illustrates, that the full data 50 is split into the non-sensitive data 50*a* and the sensitive data 50*b*, such that the non-sensitive data 50*a* and the sensitive data are separated from each other.

For the subscription of a MaaS service, a passenger may be required to input the personal data like as name, age, home address, telephone number, credit card number, passport number/travel document, and so on. These are likely to be mixing the sensitive data and non-sensitive (non-identifiable) data.

Therefore, in this embodiment, the sensitive information/data 50*b* is separated from the full data 50 and the sensitive data is handled with extra care and stored in a safe place.

For example, if a mobility service provider has the credit card information, it must comply in some embodiments with industry security standards such as Payment Card Industry Data Security Standard (PCI Standard). Hence, in such embodiments, the database and network are protected from an external network with a firewall.

This means that in some embodiments also a database for sensitive information is detached from blockchains nodes and its network (such as nodes 41 in FIG. 6 and the network 40).

Figure 8:
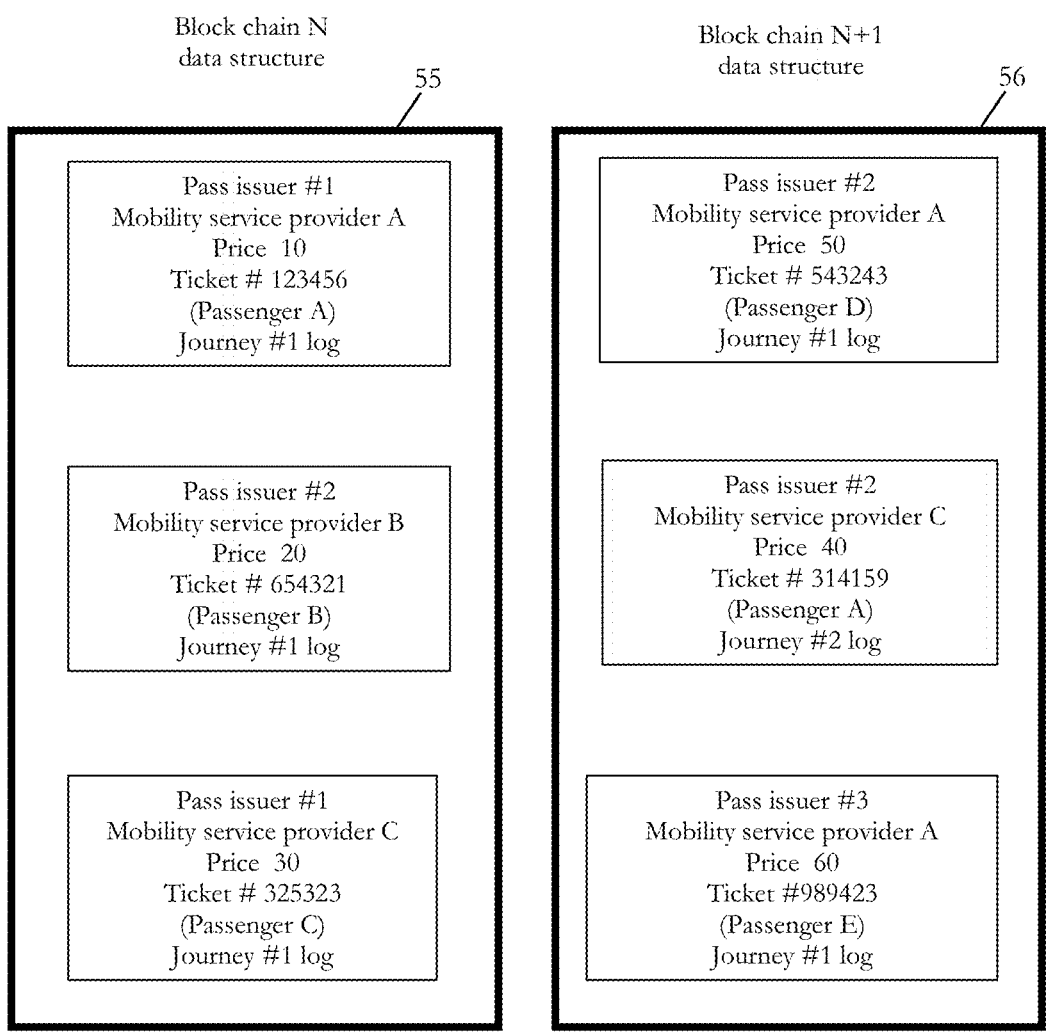
FIG. 8 illustrates blocks of a blockchain including journey data.

In some embodiments, this separation of sensitive and non-sensitive information is performed with an off-chain technique, as also illustrated in FIG. 8, which shows to blocks 55 and 55 of a blockchain.

In this embodiment, the relation between passengers' personal data and blockchains is unbundled. Thus, the sensitive data (50*b* FIG. 7) is not included in the blockchains (which is also referred to as off-chain). The personal data (sensitive data) is stored inside a MaaS provider (e.g. database, storage or the like) and is not added to blockchains.

FIG. 8 illustrates an example of a ticket and journey record of a MaaS service. The ticket may be issued by a ticket or pass issuer (e.g. transport operator) or other MaaS service provider. In the blockchain, the passenger name or any personal data is not included, but only a (unique) ticket number is included in the data structure of the blocks 55 and 56 of the block chain, together with other data, such as who issued the ticket (Pass issuer #1, etc.), who is the Mobility service provider, the price of the ticket number which is associated with a certain passenger and a journey log identifier.

For example, in this embodiment the blockchain is open for other members of the consortium, but they can only see the ticket number and not the sensitive data of the passengers (users). There is no clue who is the actual passenger in the blockchain. Only the ticket or pass issuer (or MaaS service provider) can identify the actual passenger name and identity, because he has the sensitive information stored in its database separated from the blockchain and associated with the ticket number.

However, in general, in the transport industry or tourism industry it is known that a passenger name recode (PNR) is required in some instances (see also Wikipedia https://en.wikipedia.org/wiki/Passenger_name_record).

Hence, the reservation system, e.g. provided by a mobility service provide, should keep the personal data of the passenger, since, for example, if the name of an air ticket and that on the passport do not match, boarding is typically not allowed.

In embodiments, where the discussed off-chain technology is applied, the blockchain members request the required information from the MaaS provider who has the personal data of the passenger, e.g. based on the ticket number or any other identified which is associated with the passenger.

However, in some embodiments, the off-chain technique cannot be applied, and, thus, in some embodiments, personal data of passengers in the blockchain are subject to pseudonymization and/or anonymization (see next section).

In the following, embodiments, pertaining to pseudonymization and anonymization of personal data blockchains are discussed.

As discussed, if the personal data like passenger name is required to be included in the block(s) of a blockchain, the name (or any other personal data) should be protected.

In some embodiments, the personal data is replaced, and a typical way of pseudonymization is to replace the sensitive part with characters or numbers, or zero padding, or even removing it. For example, using an initial or other acronym instead of a full name or user ID number instead of full name, etc. the personal data is removed in some embodiments. However, it may be possible to guess or derive the personal information and/or the user information may be traceable from other information.

In the following, further embodiments are discussed for pseudonymization and anonymization.

Figure 9:
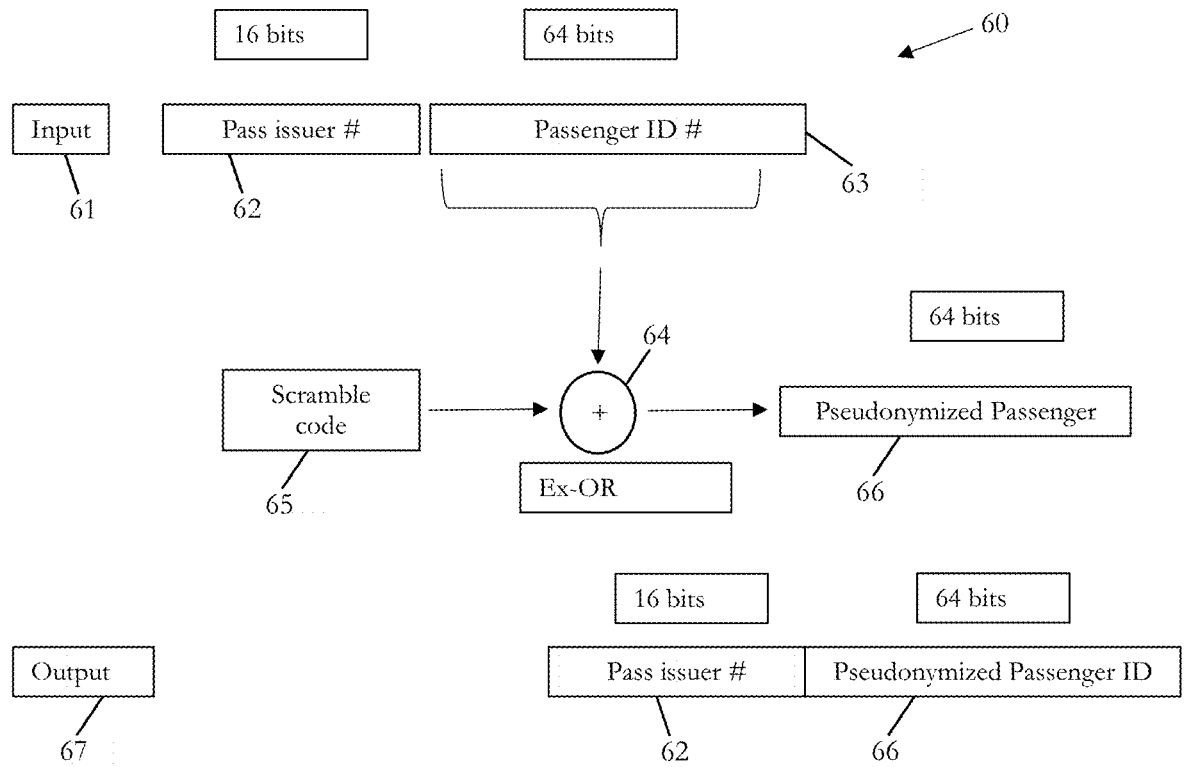
FIG. 9 illustrates pseudonymization of passenger data.

In some embodiments, scrambling (masking) is implemented, which is also illustrated in FIG. 9, where a method 60 of pseudonymization with scrambling is shown.

The input data 61 is split into two parts, namely in an unprotected part 62 including the pass issuer information and a protected part 63 including personal data, namely the passenger ID.

The data of protected part 62 are input as a stream to scrambling processing 64 ("+"). In the scrambling processing 64, the protected data 62 and a scrambling code 65 are applied to each other (mathematically Ex-OR calculation). As output data, pseudonymized passenger data 66 are generated, which are combined with the unprotected part 62 as output 67.

Thereby, other members (e.g. mobility service providers) in the consortium cannot identify the actual user in the blockchain after the scrambling, but only, for example, the pass issuer (who knows the scrambling code, or any other entity which knows the scrambling code) can de-scrambling and unmask the passenger ID.

Generally, there exist various ways for generating a scrambling code and the present disclosure is not limited to a specific implementation in that regard, but in some embodiments a linear-feedback shift register (LFSR) is used. In some embodiments, the scrambling code is also configurable and a scrambling code is selected among a large amount of candidate codes, such that this may be similar to an encryption key.

In some embodiments, the scrambling technology allows a simple hardware/software algorithm and scrambling is typically reversible (at least as long the scrambling code is available). The original source of data can descramble it, if necessary or needed.

However, reversibility may not be required in some embodiments. For example, if there is a malicious member among the blockchain members, it is possible to identify the user ID and to get the information, and, thus, in some embodiments non-reversible implementations are needed.

In the following, embodiments using encryption with a key are discussed. In principle, the scrambling and encryption are similar processes, but its purpose and design are different.

The main purpose of scrambling is data masking, and there is no key, but there is just a code number is set (i.e. initial value of shift register). If someone accidently sets the same code, it is easy to descramble the data. Moreover, scrambling of data may be vulnerable for trying all possible combinations, i.e. descrambling on the basis of a brute force attack may be possible. But, scrambling typically only involves light processing load and is easy to handle, such that it is also implemented in some embodiments, among trusted members, e.g. in a consortium of trusted members.

On the other hand, the main purpose of encryption is to provide data in secret. The algorithm of encryption is commonly open for everybody and it may use, for example, public key for de-encryption (if PKI). This is especially useful for public/untrusted groups, as it is the case for the Internet.

However, encryption may involve heavy processing load of de-encryption, complex algorithms and may also not be free available, but may be protected, e.g. subject to intellectual property.

As discussed above, GDPR requires an irreversible process for anonymized data. For example, if the data is openly provided to third party, the personal data must be anonymized.

Figure 10:
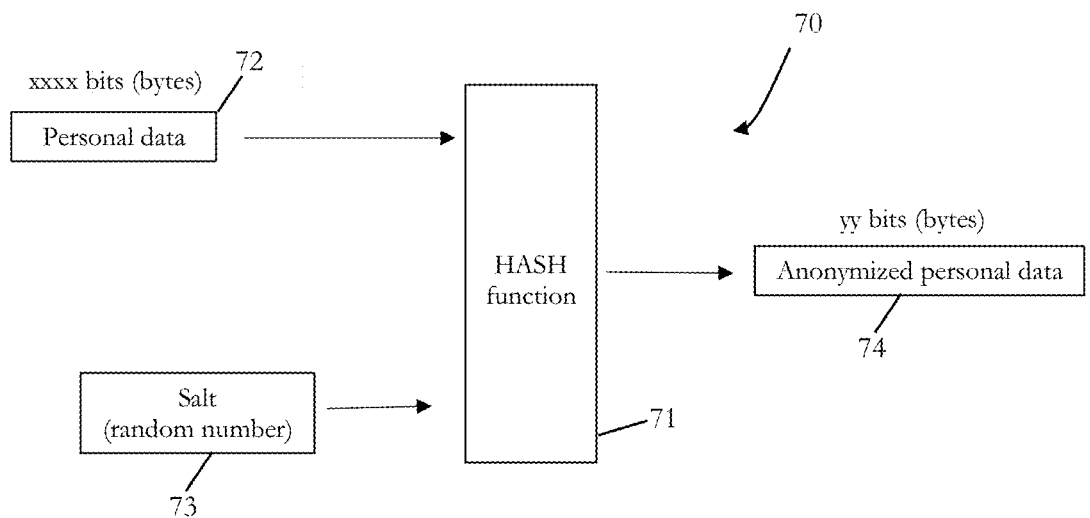
FIG. 10 illustrates anonymization of passenger data.

An embodiment of a method 70 for anonymizing data is illustrated in FIG. 10, wherein a hash function 71 is used for anonymization of data.

Generally, a hash function is any function that can be used to map input data to output data with a specific algorithm. The size of input data can be large and various, contrarily the output of data could be compact and may have a fixed size.

The input of the hash function 71 is personal data 72 (or any protection needed data) and a salt 73 of hash (or any initialization random values).

The output of the hash function are anonymized personal data 74 which are a unique value response to input values, wherein this hash output 74 is irreversible.

In some embodiments, the salt 73 is separately stored and protected.

In some embodiments, the salt key is changed, e.g. every time on application, such that this enhances the anonymization, since in this case, even if the input is the same user ID again, the output is different, since a different salt is used.

Hence, in this embodiments, due to using hashing the anonymization of the data is non-reversible, thereby also providing a intractability. This untraceable characteristic is suitable for perfect anonymization, in some embodiments, wherein it is impossible to access the original data after hash output.

Hence, this method 70 is especially useful in some embodiments for permanently removing the personal data, when, for example, the data is provided to third party for statistics/big data analysis.

As mentioned, some embodiments pertain to the access control to the distributed ledger or blockchain.

The general advantage of distributed ledger is that all the members may access the distributed database. However, the personal information should be protected and should not share without restriction in some embodiments, and, thus, in some embodiments, depending on the purpose of data use, the data access is restricted.

Generally, the access control depending on the purpose of data use, may involve the following and/or may have the following characteristics (alone or in combination):

Pass issuer or other mobility service provider who is in charge of service subscription: Such a provider has sensitive information of customer/passengers on service subscription/purchase, as also discussed above. This sensitive information including the personal data is to be protected, wherein pseudonymization is required for writing into blocks of a blockchain.

Ticket issuer/transport operator: The ticket issuer/transport operator keeps the relevant information in line with transport regulations. Depending on the type of transport (e.g. airways, railways, bus, etc.) and the type of ticket (e.g. registered passenger only), the required information may be different. The transport operator does not access unnecessary information. In this case, pseudonymization is required for writing into blocks of a blockchain.

Data analyzing by third party: The third party must not access the sensitive information. Hence, the third party should not be able to identify the personal information and it should not access pseudonymization data. Therefore, in this case anonymization is required for before the data access.

Passenger: The passenger has the right of own information control and to delete the information, but the passenger is not allowed to access other passenger's information and the passenger may not directly access the blockchain or distributed ledger.

Emergency-public safety: The public safety authority may access the full information of passengers in the event of emergency. The special encryption key is required to access the full information of passengers.

As mentioned, in some embodiments, a permissioned blockchain is implemented, and in permissioned blockchains, e.g. consortium, only a permissioned entity can access the distributed ledger/blockchain.

In theory, the security level in consortium is higher than the public blockchains. However, in some embodiments, the encryption with a separate key is also beneficial for access control.

An embodiment of a method 80 for access control to a blockchain using encryption will now be discussed under reference of FIG. 11.

Firstly, the sensitive data should be encrypted with a first key 81 (master key) which is only known to the MaaS provider having a contract with a user which is associated with the user profile data. This key should not be shared with other MaaS providers or any third parties except emergency case. Thus, the data is not shared with others. Since this key is not distributed to external server/network, the private key encryption is preferable in this embodiment. A user management function 82 has a user profile management function 82a and a passenger journey management function 82b, such that the user profile data (sensitive data) and the passenger journey data (non-sensitive data) are separated from each other and can also be handled differently and separately.

The user management function 82 communicates with a blockchain management function 83, which in turn communicates with one or more blockchains 84.

In the present embodiment, a firewall 85 is provided between the user management function 82 and the blockchain management function 83 for protecting the sensitive data, and the user management function 82 and the blockchain management function 83 may be located on different entities, e.g. different servers or other computing devices.

As mentioned, the master key 81 is used for encrypting the sensitive data, such that the sensitive data is protected through the firewall 85 and the encryption.

Secondly, the MaaS provider generates a second key 86 (service provider key). This second key 86 can be shared with other MaaS providers and can use it for blockchains, i.e. for the encryption of data which is stored in blocks in the blockchains 84 by the blockchain management function 83.

If the members which have access to the blockchains 84 are highly trusted and the number of members are not so large or members do not frequently change (e.g. in a consortium), the private key encryption is still preferable.

For example, the same key can be used for long period. Or even just scrambling with specific sequence generator without key is also possible in some embodiments in such cases, which may avoid the key distribution.

If the members are not trusted or specific reason are present, such as that blockchains are stored overseas, the public key encryption should be used.

The other mobility service providers also access the blockchains 84 over a blockchain management function 87 which is separated from blockchain management functions 88 of third parties via a firewall 89.

Moreover, a third key 90 is provided, which is shared with third parties, such that the third parties may have access to information of the blockchains which is secured with the third key 90.

Figure 12:
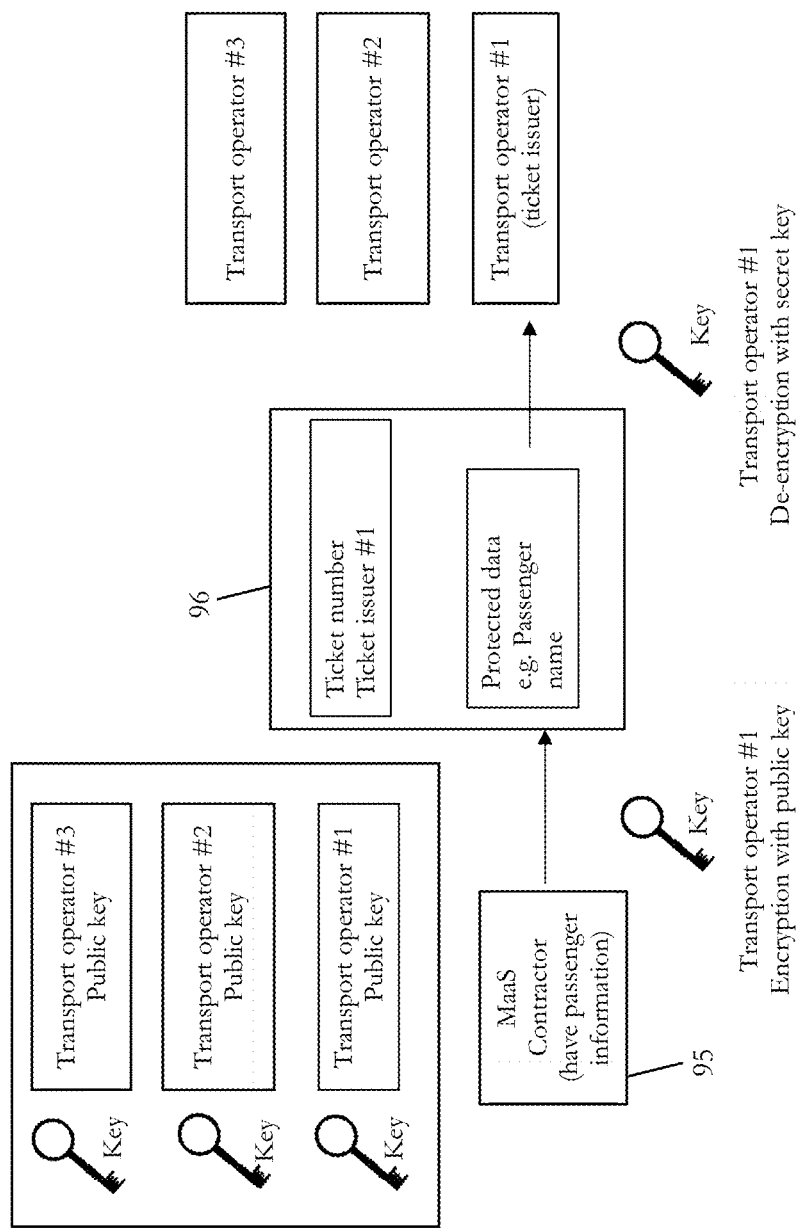
FIG. 12 illustrates separation of non-sensitive data and sensitive data, where the sensitive data is protected.

The principle of data protection in blockchains is now discussed in more detail under reference of FIG. 12.

Here, it is assumed that a MaaS operator 95 has a contract with a passenger, as mentioned also above, and, thus, the MaaS operator 95 has also the passenger's sensitive information and data.

A transport provider/operator #1 issues a ticket 96 based on the MaaS operator contract with the passenger, but the transport operator #1 does not have the passenger information details.

The MaaS operator has the details of passenger information, i.e. the sensitive information, and inserts it in the ticket issued by the transport operator #1, wherein it is encrypted with the public key encryption of the specific transport operator, in this case transport operator #1. This information is put into a block including the ticket 96 of a blockchain, as discussed above.

As can be taken from FIG. 12, in this embodiment, for each transport operator an own public key is provided, and here it is assumed that the MaaS operator has all the public keys in advance.

The transport provider/operator #1 can de-encrypt the protected data in the block received from the blockchain with its own private key. The secret private key has not been shared with other transport operators.

Hence, other transport operators or even third parties can access the block in this embodiment, but cannot de-encrypt the protected data because their secret private key is different.

In some embodiments, in principal, the data are open data. Thus, the third key (see FIG. 11) should be shared with other third parties for data analysis (e.g. for getting statistics, big data analysis or the like).

Figure 13:
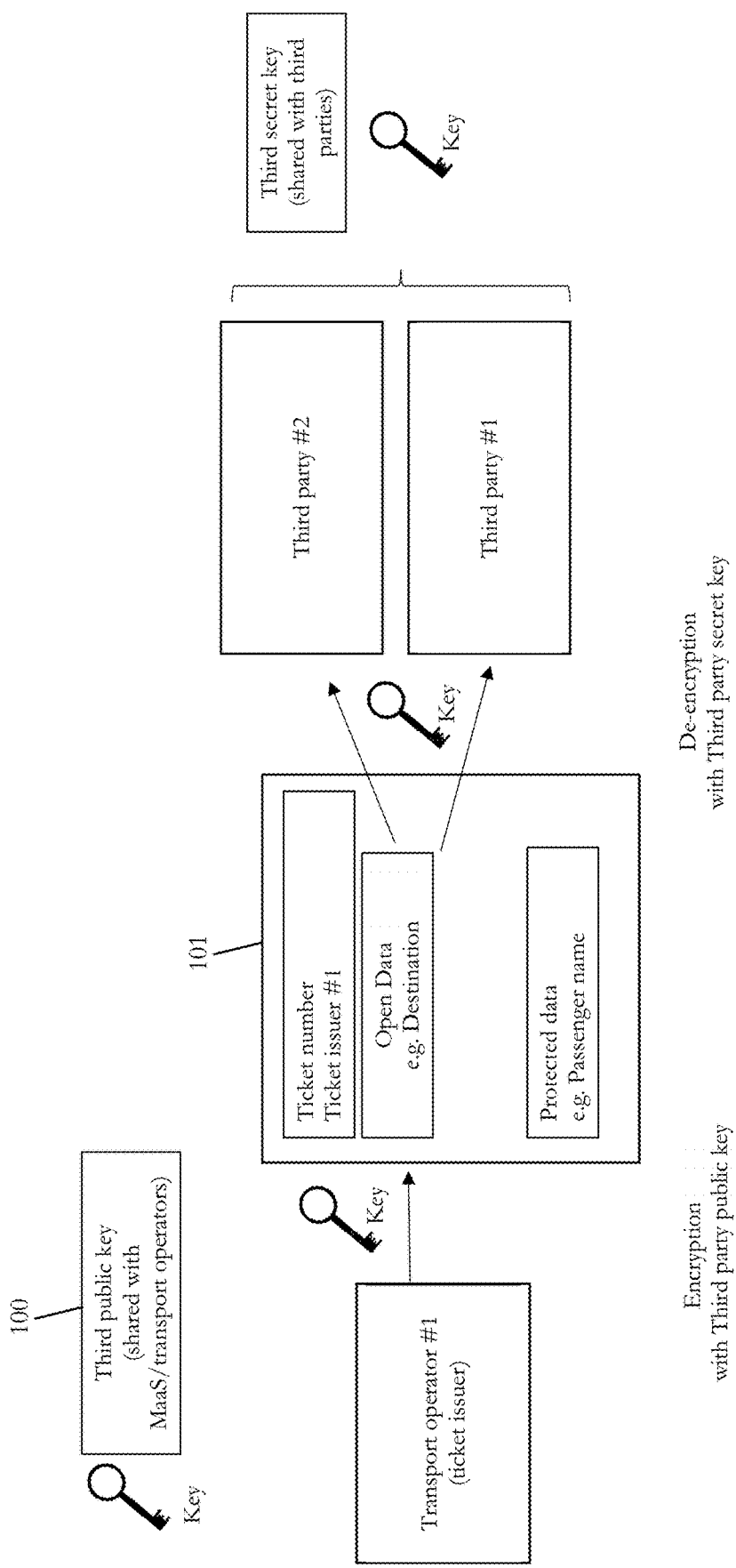
FIG. 13 illustrates third party encryption of data.

In the following, an embodiment pertaining to open data access for third parties is discussed under reference of FIG. 13.

Here, generally, the transport operators have the third party public key 100 for open data. The third party private key 100 is shared with multiple third parties who would like to use it for data analysis. The transport operator #1 inserts the data in a block illustrated as block 101 with encryption of the open data based on the third party key. One or more of the third parties can de-encrypt the open data with the secret third key 100 for open data, but cannot de-encrypt the protected data, which is encrypted, as discussed above, for example, with a private key only known to the mobility service providers.

If more than one third party key is used, it is possible in some embodiments to provide multi-level access control (depending on the level of data confidentiality) or access control of specific groups (depending on the belonging group of third party).

Figure 14:
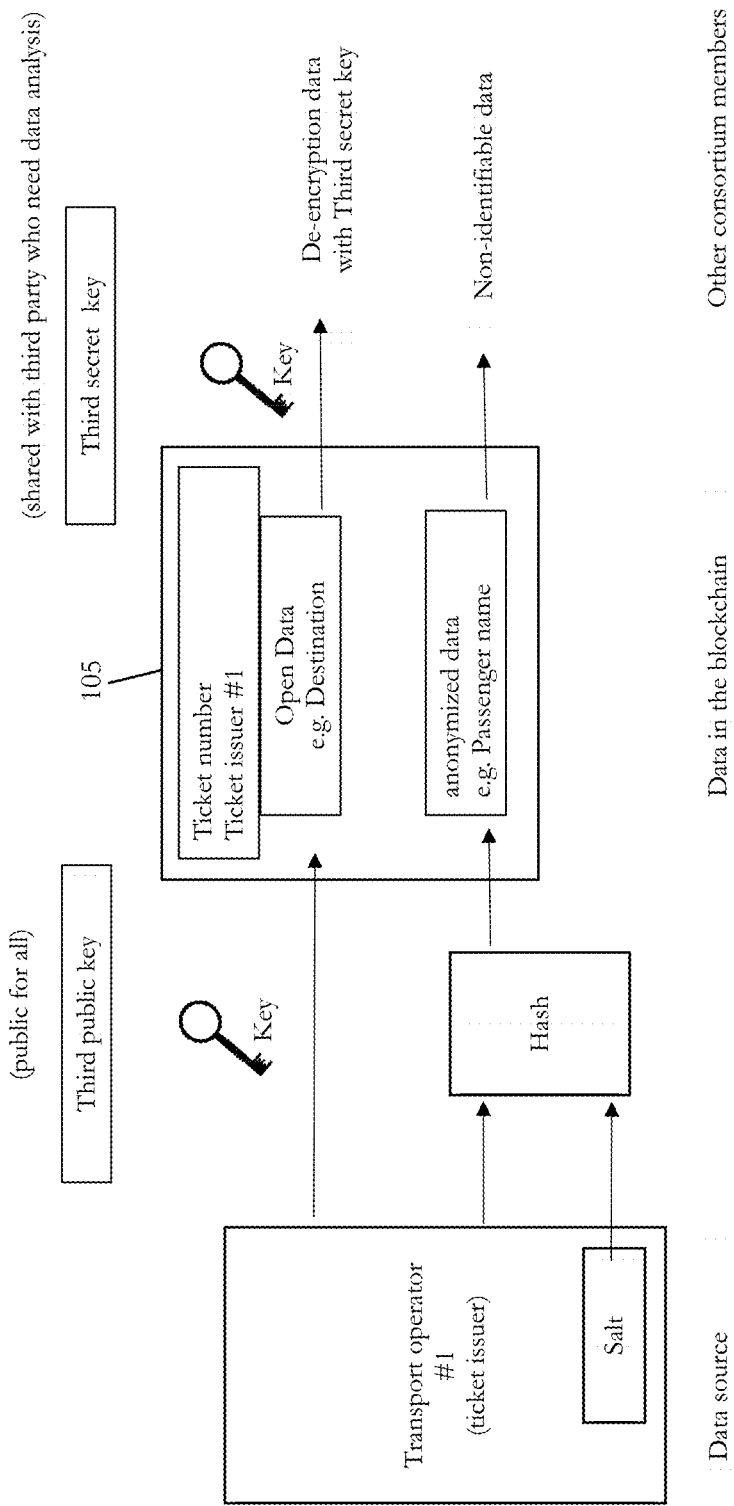
FIG. 14 illustrates third party access to data, wherein the sensitive data are anonymized.

In some embodiments, the protected data (i.e. the sensitive data) in the block can be anonymized. For example, as also illustrated in FIG. 14, in some embodiments the anonymized data and the open data are combined in the blockchain.

Here, the transport operator #1 (ticket issuer) generates anonymized data (e.g. passenger name), with a salt and the hash method as discussed above under reference of FIG. 10, which are input into a block 105 for a blockchain. The block 105 also has open data (e.g. destination) which is encrypted with the third public key. Moreover, the ticket number and the ticket issuer #1 are stored in the block, as also discussed above.

The third public/secret key is shared with others and can be used for de-encryption o the open data in the block 105, whereas the anonymized data cannot be de-encrypted and can also not identified, as discussed above.

Figure 15:
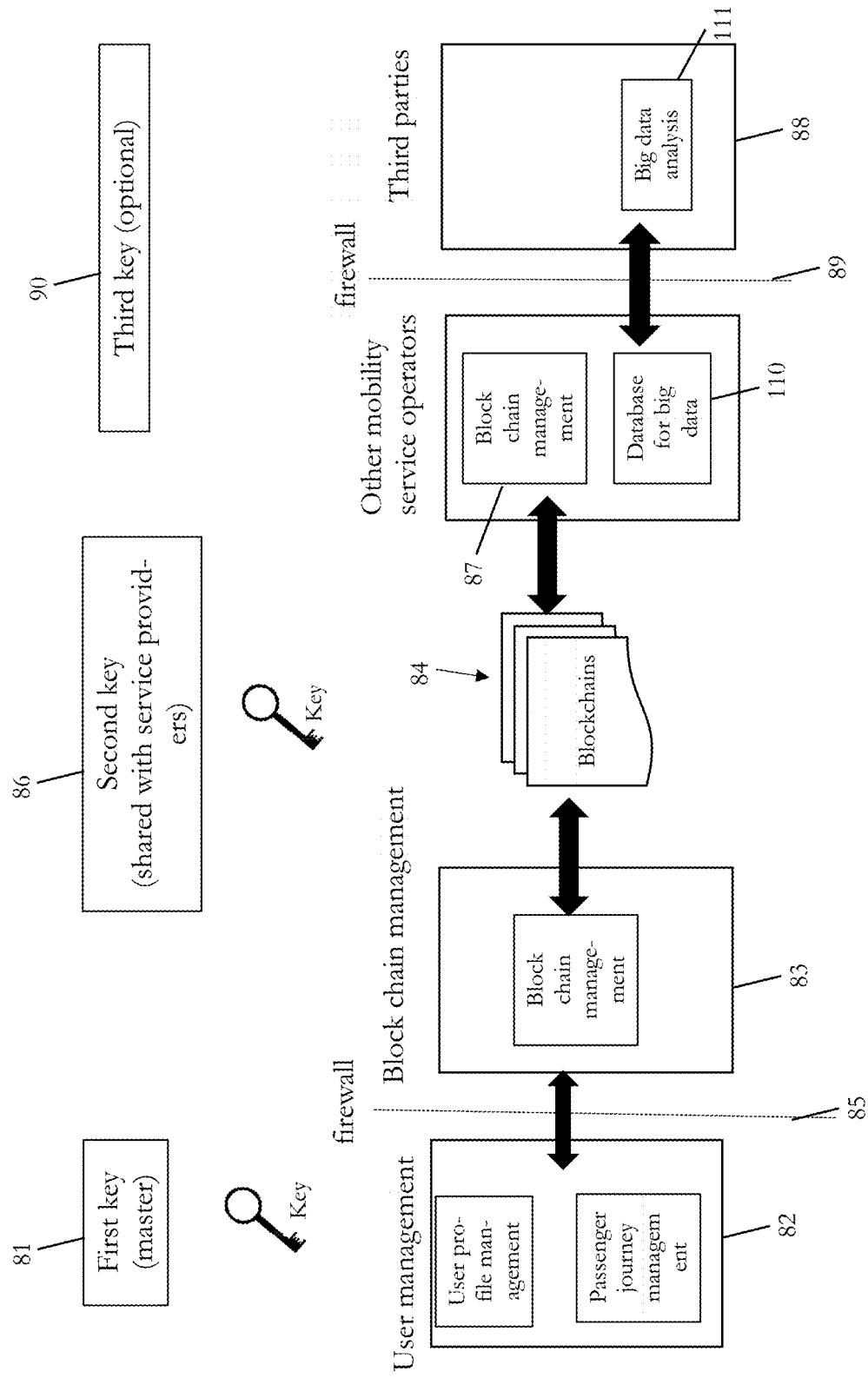
FIG. 15 illustrates an application programming interface for third party access for big data analysis.

Some embodiments pertain to an application programming interface (API), such as API 110 illustrated in FIG. 15.

Figure 11:
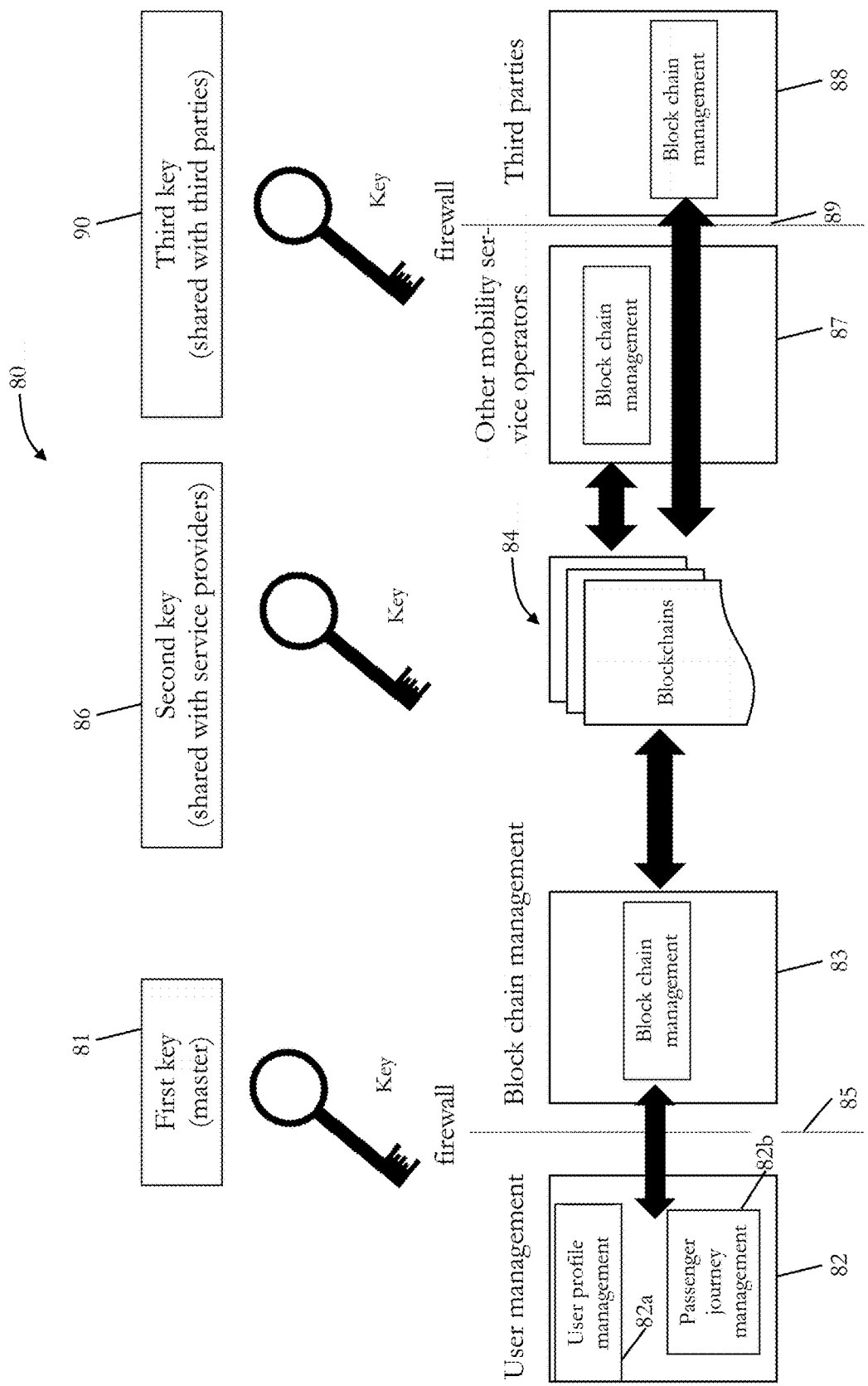
FIG. 11 illustrates an embodiment of using different keys of data protection in a blockchain.

FIG. 15 basically corresponds to FIG. 11 and the same reference numbers also denote the same entities and functions. The only difference between the embodiment of FIG. 11 and that of FIG. 15 is that in the embodiment of FIG. 15, a database 110 for big data is provided which also provides an API which can be accessed by third parties for a big data analysis function 111.

The transport statistics/data stored in the database 110 for big data could be useful for public and commercial purposes. For example, governments may use it for city planning and the private company may decide the location of a new shop based on it. The big data in this embodiment is commonly accessible and the data is available with the open application interface (API) 110 for wider third parties.

A mobility service provider or trusted data base provider on behalf of a mobility service provider stores the data in the database 110 without sensitive information. The mobility service provide or trusted data base provider provides the API 110, which access the database, for external third parties. An external third party can access the database 110 without key (optionally with key).

The API 110 may include an identity check in order to prevent malicious access. For example, the API may support authentication protocol like OAuth 2.0 (RFC 6749) (https://oauth.net/2/).

In some embodiments, sensitive data may be erased from the blockchains, and, in the following, embodiments pertaining to erasing of sensitive data are discussed under reference of FIGS. 16 and 17.

Generally, blockchains are implemented such that data cannot be erased, since blockchains are originally intended for permanent data store.

Figure 17:
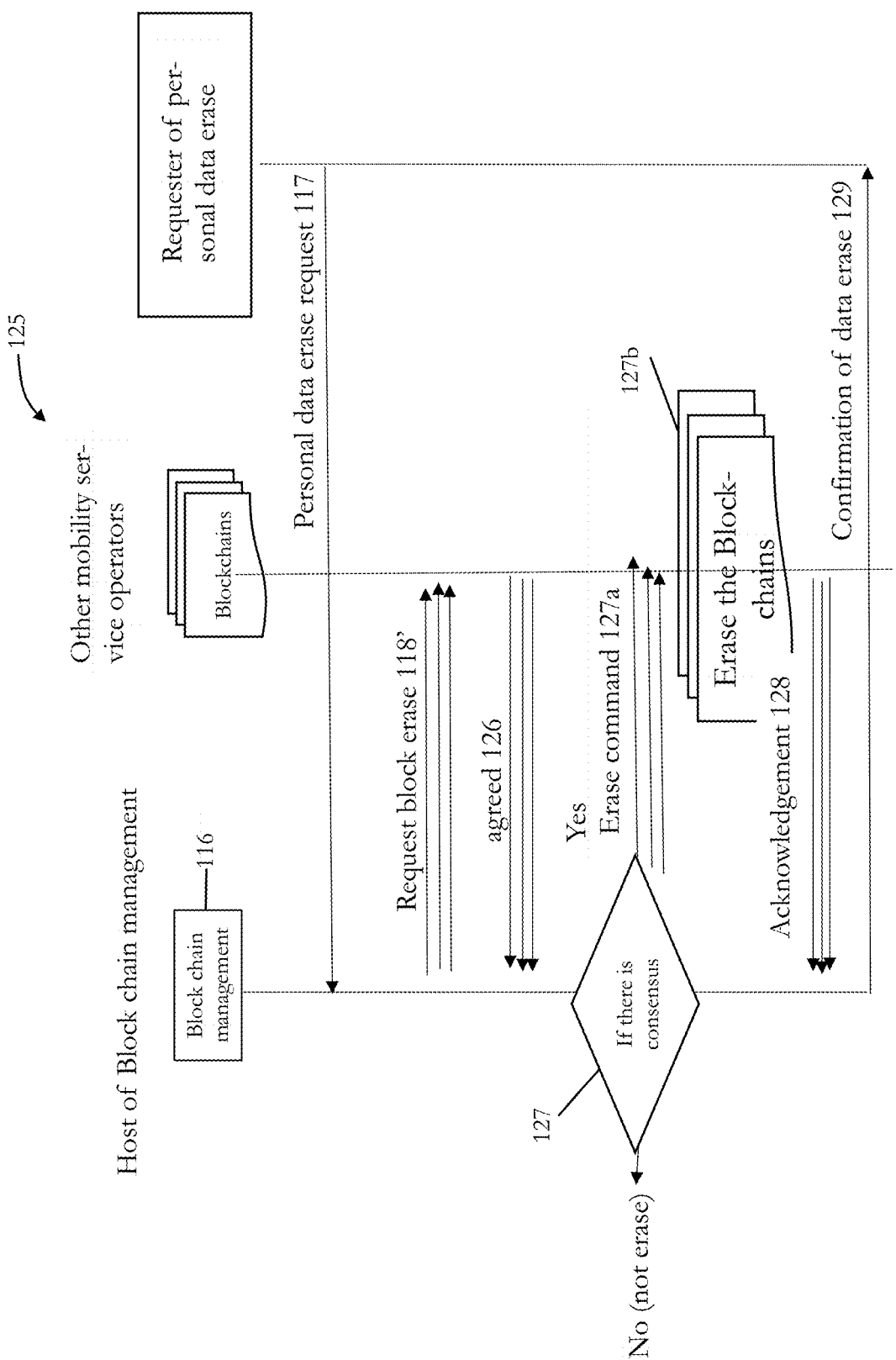
FIG. 17 illustrates a second embodiment for erasing data from the blockchain, by erasing blocks.

In a first embodiment, illustrated also in FIG. 17, a method 115 for erasing sensitive data from a blockchain is keeps the sensitive or to erased data in the blockchain, but invalidates the key However, even if the data is reserved in the blockchains, but if there is no key to de-encryption, it is equivalent to erasing the data, although this is not an erasing in a strict sense, because the data is still present, but it cannot be de-encrypted anymore.

In the present embodiment, it is assumed that there is a host of blockchains management 116 (typically, the MaaS provider who has the contract with passenger). One of the members request the erase of data at 117, while another member has the blockchain and the key for the decryption of the data.

Hence, the flow in method 115 is as follows.

At 117, as mentioned, one or more of the members of the consortium of mobility service providers request to delete the personal data in the block (or any sensitive data) to host 116.

The host 116 sends/broadcasts at 118 the request for invalidation of the key to the other blockchain members of the consortium.

At 119, the other blockchain members delete the key and send at 120 the acknowledgement to host 116.

At 121, the host sends the confirmation of data erase to the requester.

There exist various ways for invalidating the key. In some embodiments, the key has timer or validity time/date (or data itself has validity timer), and the key may be automatically deleted after the time/date is expired or a de-encryption algorithm may reject the key after the time/date expired.

Another embodiment, of a method 125 for erasing sensitive data from a blockchain is illustrated in FIG. 17, wherein the blockchain is erased after consensus of consortium members and wherein same reference numbers denote the same entities and functions or method steps.

Advantageously, in a permission blockchain (consortium type) it is possible to freely manage the blockchain within the members of the consortium.

Figure 16:
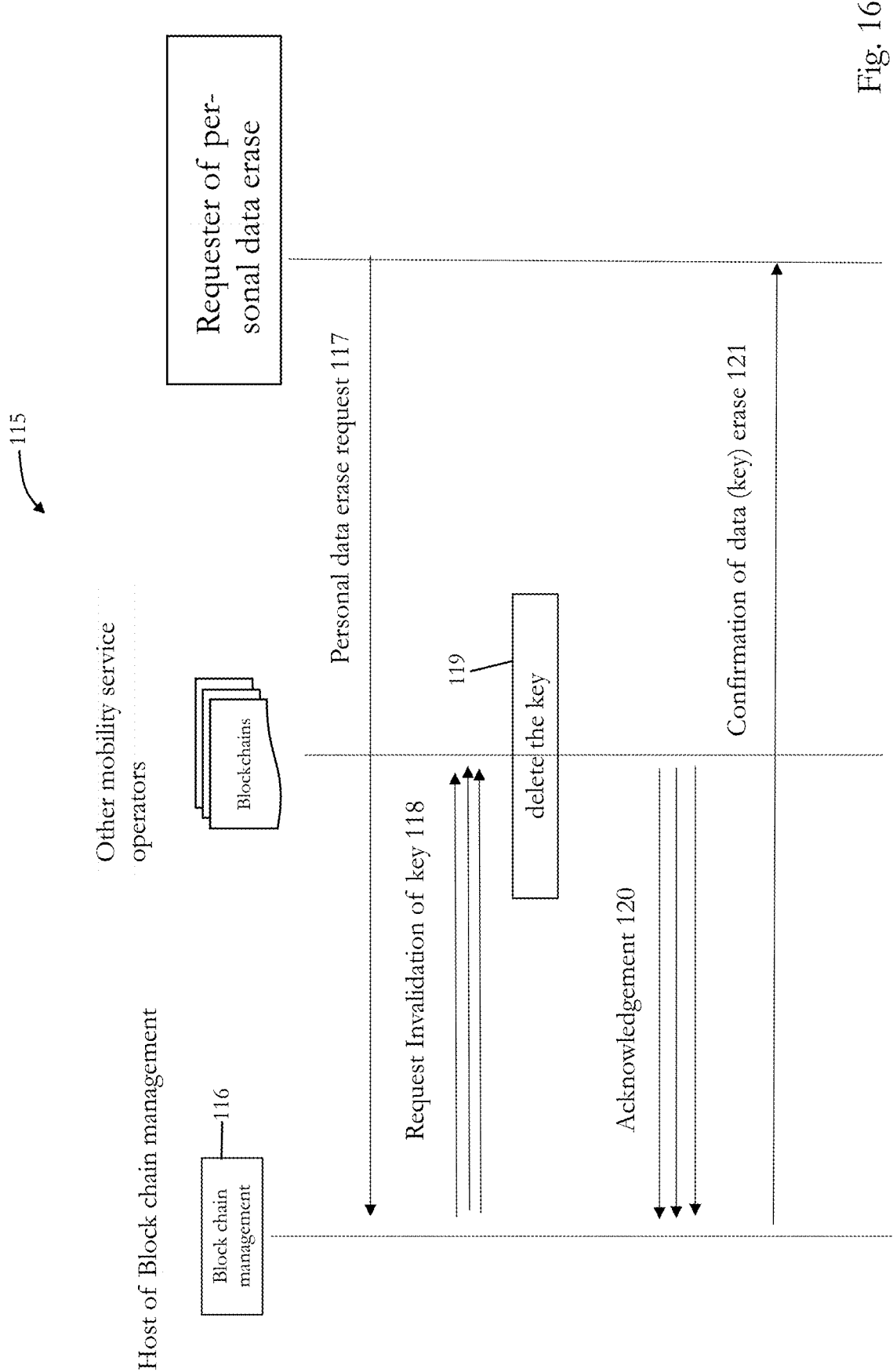
FIG. 16 illustrates a first embodiment for erasing data from the blockchain by invalidating a key.

As already discussed for the embodiment of FIG. 16, it is assumed that there is host 116 of blockchains management (typically, the MaaS provider who has the contract with passenger).

One of the members of the consortium requests to erase the (sensitive) data, wherein another member has the blockchain and the associated key for it.

Hence, the flow is as follows:

At 117, one (or more) member requests to delete the personal data in the block (or any sensitive data) to the host 116.

At 118', the host 116 sends/broadcasts the request of block erase to the other blockchain members, wherein the request may be to erase a specific part of a block, multiple blocks or all parts of the blockchain (i.e. the whole blockchain).

The other blockchain members check whether it is acceptable or not. If it is acceptable, they send an agree command at 126 to host 116. For example, if a revenue share calculation has not been finished yet, the other members may send a reject or wait command.

At 127, it is checked whether there is consensus, based on the received commands at 126. If there is consensus to delete the block, the host sends/broadcasts the respective command 127a to delete the block, otherwise the blockchain is not erased. Each member deletes the block according to the command at 127b.

At 128, the members send the acknowledgement of successful block delete to the host 116 and at 129, the host sends the confirmation of data erase to the requester.

Generally, anonymization of data with a hash function is known, as discussed. A User ID or Personal identifier may be transformed in anonymization data with anonymization engine. The anonymized data may be aggregated and stored in a central module. Anonymizing prevents the data miner from identifying personal in the data. In some embodiments, as discussed herein, such an anonymization is applied to blockchains or distributed ledgers.

Moreover, although it is generally known to store sensitive data in a blockchain or distributed ledger, as discussed, above, the present disclosure in some embodiments provides the split the data into sensitive part and non-sensitive part and not to store the sensitive part in the blockchains.

Figure 18:
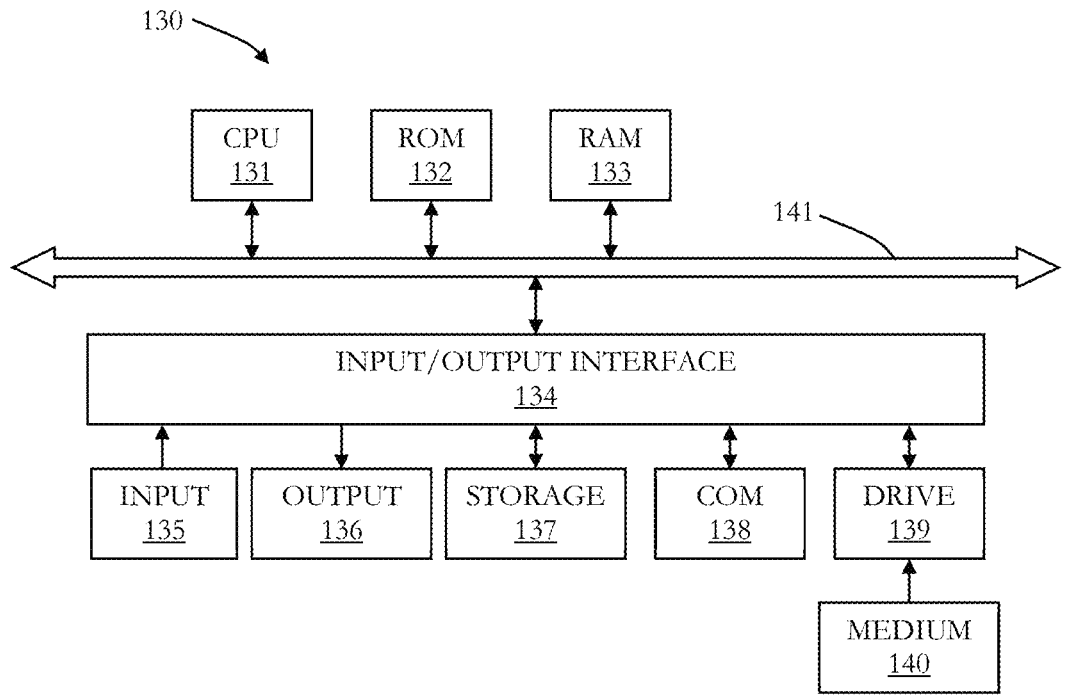
FIG. 18 illustrates an embodiment of a general-purpose computer on the basis of which a network equipment or a communication device is implemented in some embodiments.

In the following, an embodiment of a general purpose computer 130 is described under reference of FIG. 18. The computer 130 can be implemented such that it can basically function as any type of network equipment, e.g. a base station or new radio base station, transmission and reception point, or communication device, such as user equipment, (end) terminal device or the like as described herein. The computer has components 131 to 141, which can form a circuitry, such as any one of the circuitries of the network equipments and communication devices, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station or as user equipment (end terminal).

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SCFDMA (uplink)) and network interfaces (implementing for example protocols such as S1-AP, GTPU, S1-MME, X2-AP, or the like). Moreover, the computer 130 may have one or more antennas and/or an antenna array. The present disclosure is not limited to any particularities of such protocols.

Figure 19:
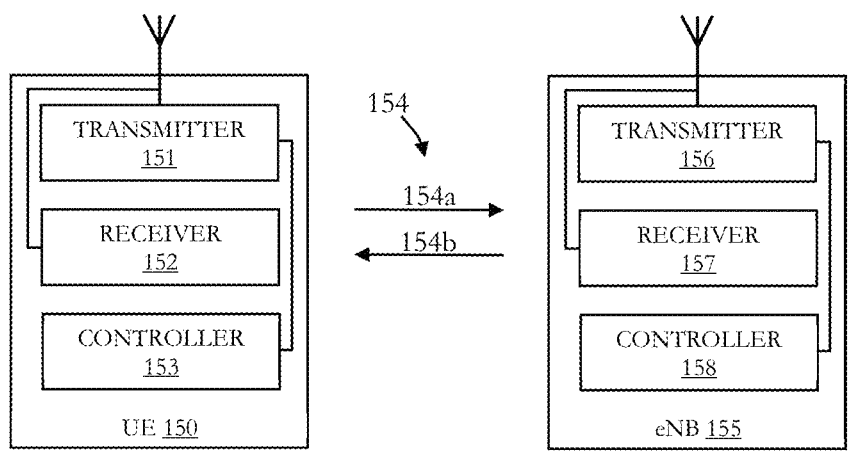
FIG. 19 illustrates an embodiment of an eNodeB and a user equipment communicating with each other.

An embodiment of an user equipment UE 150 and an eNB 155 (or NR eNB/gNB) and a communications path 154 between the UE 150 and the eNB 155, which are used for implementing embodiments of the present disclosure, is discussed under reference of FIG. 19. The UE 150 is an example of a communication device and the eNB is an example of a base station (i.e. a network equipment), without limiting the present disclosure in that regard.

The UE 150 has a transmitter 151, a receiver 152 and a controller 153, wherein, generally, the technical functionality of the transmitter 151, the receiver 152 and the controller 153 are known to the skilled person, and, thus, a more detailed description of them is omitted.

The eNB 155 has a transmitter 156, a receiver 157 and a controller 158, wherein also here, generally, the functionality of the transmitter 156, the receiver 157 and the controller 158 are known to the skilled person, and, thus, a more detailed description of them is omitted.

The communication path 154 has an uplink path 154a, which is from the UE 150 to the eNB 155, and a downlink path 154b, which is from the eNB 155 to the UE 150.

During operation, the controller 153 of the UE 150 controls the reception of downlink signals over the downlink path 154b at the receiver 152 and the controller 153 controls the transmission of uplink signals over the uplink path 154a via the transmitter 151.

Similarly, during operation, the controller 158 of the eNB 155 controls the transmission of downlink signals over the downlink path 154b over the transmitter 156 and the controller 158 controls the reception of uplink signals over the uplink path 154a at the receiver 157.

Further summarizing, as is apparent from the description, some embodiments pertain to a communication network node for providing data to a distributed ledger, wherein the node has circuitry configured to provide a user data management part for separating sensitive user data (e.g. passenger, name, home address, telephone, number, gender, age, passport number, credit card number, etc.) and non-sensitive user data (such as journey data or statistics of the journey or the like), and provide the non-sensitive user data to the distributed ledger. The communication network node may be a network equipment, such as a base station, eNodeB or the like, but the node may also be configured as a communication device, such as a user equipment, an (end) terminal device or the like (e.g. mobile phone, smartphone, computer, laptop, notebook, etc.) which has circuitry which is configured accordingly.

In some embodiments, the circuitry is further configured to store the sensitive user data in a database of the node, hence the node may include the database or it may be connected or associated with the database.

In some embodiments, the distributed ledger includes (or is) a blockchain, wherein the blockchain may include multiple blocks, the blocks including the non-sensitive user data.

Hence, in some embodiments, the sensitive user data is only stored in a database of the node, while the distributed ledger or blockchain only includes the non-sensitive data.

In some embodiments, the distributed ledger includes data for mobility as a service.

In some embodiments, the access to the distributed ledger is granted based on a permission right, wherein the node may be part of a consortium. The consortium may be provided by the mobility service provides, wherein, for example, each node may correspond to or may be associated with one mobility service provider.

Some embodiments pertain to a communication network having multiple nodes for providing a distributed ledger, wherein at least one node has circuitry configured to provide a user data management part for separating sensitive user data and non-sensitive user data, and provide the non-sensitive user data to the distributed ledger.

The communication network may be configured as a telecommunication network, wherein the telecommunication network may be configured as a mobile telecommunication network. The nodes of the communication network may be such configured that they provide the distributed ledger.

In some embodiments, as discussed, the circuitry is further configured to store the sensitive user data in a database of the node.

As discussed, the distributed ledger may include a blockchain, wherein the blockchain may include multiple blocks, the block including the non-sensitive user data, and wherein the distributed ledger may include data for mobility as a service. Hence, in some embodiments, the communication network and its nodes are configured to provide MaaS.

In some embodiments, access to the distributed ledger is granted based on a permission right, wherein the nodes may be part of a consortium (e.g. a MaaS consortium).

In some embodiments, personal user data (e.g. name or other data which might uniquely identify a user) in the distributed ledger are pseudonymized or anonymized. The personal user data may be input into the distributed ledger, since, as discussed above, for example for air tickets the passenger name is to known for boarding.

In some embodiments, the personal user data are pseudonymized by scrambling the sensitive user data, and wherein the personal user data may be anonymized based on applying a hash algorithm.

In some embodiments, an access control for the non-sensitive data is provided, wherein the access control may be performed on the basis of a key, the key being used for encryption of the non-sensitive data.

In some embodiments, the access control provides different keys for different parties, such that different parties may get different level of access. Different parties may be, for example, the node having the sensitive data, other nodes which have access to the distributed ledger (may be, for example, part of the consortium) and third parties which neither have the sensitive data nor access to the distributed ledger or which are not part of the consortium, do not provider MaaS or just need data for data analysis.

In some embodiments, the access control gives access to the non-sensitive data over an application programming interface.

In some embodiments, (the) personal user data or the non-sensitive user data can be erased in response to a request from at least one node, wherein the data may be erased by invalidation of a key or by erasing data from the distributed ledger (including erasing all data). As mentioned, the distributed ledger may include a blockchain and at least one block may be erased (including the personal data to be erased).

Some embodiments pertain to a method for controlling a communication network having multiple nodes for providing a distributed ledger (as discussed herein), the method includes providing a user data management part for separating sensitive user data and non-sensitive user data, and providing the non-sensitive user data to the distributed ledger, as discussed in detail above. All steps discussed herein to be performed, e.g. by the communication network and/or by the communication network node may be part of the method.

The methods as described herein are also implemented in some embodiments as a computer program causing a computer and/or a processor and/or circuitry to perform the method, when being carried out on the computer and/or processor and/or circuitry. In some embodiments, also a nontransitory computer-readable recording medium is provided that stores therein a computer program product, which, when executed by a processor, such as the processor described above, causes the methods described herein to be performed.

It should be recognized that the embodiments describe methods with an exemplary ordering of method steps. The specific ordering of method steps is however given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A communication network node for providing data to a distributed ledger, wherein the node comprises circuitry configured to:
provide a user data management part for separating sensitive user data and non-sensitive user data, and provide the non-sensitive user data to the distributed ledger.

(2) The communication network node of (1), wherein the circuitry is further configured to store the sensitive user data in a database of the node.

(3) The communication network node of (1) or (2), wherein the distributed ledger includes a blockchain.

(4) The communication network node of (3), wherein the blockchain includes multiple blocks, the blocks including the non-sensitive user data.

(5) The communication network node of anyone of (1) to (4), wherein the distributed ledger includes data for mobility as a service.

(6) The communication network node of anyone of (1) to (5), wherein access to the distributed ledger is granted based on a permission right.

(7) The communication network node of (6), wherein the node is part of a consortium.

(8) A communication network comprising multiple nodes for providing a distributed ledger, wherein at least one node comprises circuitry configured to:
provide a user data management part for separating sensitive user data and non-sensitive user data, and provide the non-sensitive user data to the distributed ledger.

(9) The communication network of (8), wherein the circuitry is further configured to store the sensitive user data in a database of the node.

(10) The communication network of (8) or (9), wherein the distributed ledger includes a blockchain.

(11) The communication network of (10), wherein the blockchain includes multiple blocks, the block including the non-sensitive user data.
(12) The communication network of anyone of (8) to (11), wherein the distributed ledger includes data for mobility as a service.
(13) The communication network of anyone of (8) to (12), wherein access to the distributed ledger is granted based on a permission right.
(14) The communication network of (13), wherein the nodes are part of a consortium.
(15) The communication network of anyone of (8) to (14), wherein personal user data in the distributed ledger are pseudonymized or anonymized.
(16) The communication network of (15), wherein the personal user data are pseudonymized by scrambling the sensitive user data.
(17) The communication network of (15), wherein the personal user data are anonymized based on applying a hash algorithm.
(18) The communication network of anyone of (8) to (17), wherein an access control for the nonsensitive data is provided.
(19) The communication network of (18), wherein the access control is performed on the basis of a key, the key being used for encryption of the non-sensitive data.
(20) The communication network of (19), wherein the access control provides different keys for different parties.
(21) The communication network of anyone of (18) to (20), wherein the access control gives access to the non-sensitive data over an application programming interface.
(22) The communication network of anyone of (8) to (21), wherein personal user data or the non-sensitive user data can be erased in response to a request from at least one node.
(23) The communication network of (22), wherein data is erased by invalidation of a key.
(24) The communication network of (22), wherein the data is erased by erasing data from the distributed ledger.
(25) The communication network of (24), wherein the distributed ledger includes a blockchain and wherein at least one block is erased.
(26) A method for controlling a communication network comprising multiple nodes for providing a distributed ledger, the comprising:
providing a user data management part for separating sensitive user data and non-sensitive user data, and providing the non-sensitive user data to the distributed ledger.
(27) The method of (26), further comprising storing the sensitive user data in a database of a node.
(28) The method of (26) or (27), wherein the distributed ledger includes a blockchain.
(29) The method of (28), wherein the blockchain includes multiple blocks, the block including the non-sensitive user data.
(30) The method of anyone of (26) to (29), wherein the distributed ledger includes data for mobility as a service.
(31) The method of anyone of (26) to (30), wherein access to the distributed ledger is granted based on a permission right.
(32) The method of (31), wherein the nodes are part of a consortium.

(33) The method of anyone of (26) to (32), wherein personal user data in the distributed ledger are pseudonymized or anonymized.
(34) The method of (33), wherein the personal user data are pseudonymized by scrambling the sensitive user data.
(35) The method of (33), wherein the personal user data are anonymized based on applying a hash algorithm.
(36) The method of anyone of (26) to (35), wherein an access control for the non-sensitive data is provided.
(37) The method of (36), wherein the access control is performed on the basis of a key, the key being used for encryption of the non-sensitive data.
(38) The method of (37), wherein the access control provides different keys for different parties.
(39) The method of anyone of (36) to (38), wherein the access control gives access to the nonsensitive data over an application programming interface.
(40) The method of anyone of (26) to (39), wherein personal user data or the non-sensitive user data can be erased in response to a request from at least one node.
(41) The method of (40), wherein data is erased by invalidation of a key.
(42) The method of (40), wherein the data is erased by erasing data from the distributed ledger.
(43) The method of (42), wherein the distributed ledger includes a blockchain and wherein at least one block is erased.

The invention claimed is:

1. A method for controlling a communication network comprising multiple nodes for providing a distributed ledger, the comprising:
   separating sensitive user data and nonsensitive user data associated with a mobility as a service transaction;
   providing the non-sensitive user data to the distributed ledger;
   storing the sensitive user data in a database of a node separate from the distributed ledger;
   generating a hash of the sensitive user data and storing the hash on the distributed ledger;
   verifying, using the hash, the sensitive user data without disclosing the sensitive user data on the distributed ledger;
   encrypting the sensitive user data using a master encryption key that is accessible only to a mobility as a service provider having a contract with a user associated with the sensitive user data; and
   encrypting the non-sensitive user data using a service provider encryption key that is shared among multiple mobility as a service providers having access to the distributed ledger.

2. The method of claim 1, wherein the distributed ledger includes a blockchain.

3. The method of claim 2, wherein the blockchain includes multiple blocks, the blocks including the non-sensitive user data.

4. The method of claim 1, wherein the distributed ledger includes data for mobility as a service.

5. The method of claim 1, wherein access to the distributed ledger is granted based on a permission right.

6. The method of claim 5, wherein the nodes are part of a consortium.

7. The method of claim 1, wherein personal user data in the distributed ledger are pseudonymized or anonymized.

8. The method of claim 7, wherein the personal user data are pseudonymized by scrambling the sensitive user data.

9. The method of claim 7, wherein the personal user data are anonymized based on applying a hash algorithm.

10. The method of claim 1, wherein an access control for the non-sensitive data is provided.

11. The method of claim 10, wherein the access control is performed on the basis of a key, the key being used for encryption of the non-sensitive data.

12. The method of claim 11, wherein the access control provides different keys for different parties.

13. The method of claim 10, wherein the access control gives access to the non-sensitive data over an application programming interface.

14. The method of claim 1, wherein personal user data or the non-sensitive user data can be erased in response to a request from at least one node.

15. The method of claim 14, wherein data is erased by invalidation of a key.

16. The method of claim 14, wherein the data is erased by erasing data from the distributed ledger.

17. The method of claim 16, wherein the distributed ledger includes a blockchain and wherein at least one block is erased.

18. Circuitry for a communication network node for providing data to a distributed ledger, configured to:
separate sensitive user data and non-sensitive user data associated with a mobility as a service transaction,
provide the non-sensitive user data to the distributed ledger,
store the sensitive user data in a database of a node separate from the distributed ledger,
generate a hash of the sensitive user data and storing the hash on the distributed ledger,
verify, using the hash, the sensitive user data without disclosing the sensitive user data on the distributed ledger,
encrypt the sensitive user data using a master encryption key that is accessible only to a mobility as a service provider having a contract with a user associated with the sensitive user data, and
encrypt the non-sensitive user data using a service provider encryption key that is shared among multiple mobility as a service providers having access to the distributed ledger.

19. A system, comprising:
a communication network including multiple nodes for providing a distributed ledger; and
circuitry configured to
separate sensitive user data and non-sensitive user data associated with a mobility as a service transaction, and
provide the non-sensitive user data to the distributed ledger,
store the sensitive user data in a database of a node separate from the distributed ledger,
generate a hash of the sensitive user data and storing the hash on the distributed ledger,
verify, using the hash, the sensitive user data without disclosing the sensitive user data on the distributed ledger,
encrypt the sensitive user data using a master encryption key that is accessible only to a mobility as a service provider having a contract with a user associated with the sensitive user data, and
encrypt the non-sensitive user data using a service provider encryption key that is shared among multiple mobility as a service providers having access to the distributed ledger.

* * * * *